(12) United States Patent
Ishikawa et al.

(10) Patent No.: US 6,230,562 B1
(45) Date of Patent: May 15, 2001

(54) DETECTION CIRCUIT FOR VIBRATORY GYRO AND VIBRATORY GYRO DEVICE USING THE SAME

(75) Inventors: Hiroshi Ishikawa; Masanori Yachi; Sumio Yamada, all of Kawasaki; Yoshitaka Takahashi, Yokohama; Yoshio Satoh, Kawasaki, all of (JP)

(73) Assignees: Fujitsu Limited, Kawasaki; Fujitsu Towa Electron Limited, Kanagawa, both of (JP)

(*) Notice: Subject to any disclaimer, the term of this patent is extended or adjusted under 35 U.S.C. 154(b) by 0 days.

(21) Appl. No.: 08/816,123

(22) Filed: Mar. 11, 1997

(30) Foreign Application Priority Data

Aug. 30, 1996 (JP) .................................................. 8-230953

(51) Int. Cl.[7] .................................................. G01C 19/00
(52) U.S. Cl. .................................................. 73/504.02
(58) Field of Search ........................... 73/504.02, 504.12, 73/504.14, 504.15, 504.16, 497; 310/311, 314, 315, 319, 370

(56) References Cited

U.S. PATENT DOCUMENTS 4,694,696 * 9/1987 Hojo et al. ........................... 73/497

FOREIGN PATENT DOCUMENTS

| 0 773 430A1 | 5/1997 | (EP) . |
| 3-226620 | 10/1991 | (JP) . |
| 6-18267 | 1/1994 | (JP) . |
| 7-146149 | 6/1995 | (JP) . |

* cited by examiner

Primary Examiner—Richard A. Moller
(74) Attorney, Agent, or Firm—Arent Fox Kintner Plotkin & Kahn, PLLC

(57) ABSTRACT

A detection circuit for a vibratory gyro includes a first circuit which detects a detection signal output from the vibratory gyro and produces an output signal indicative of an angular velocity applied to the vibratory gyro, and a second circuit which is operatively coupled to the first circuit and reduces a leakage component included in the detection signal.

11 Claims, 27 Drawing Sheets

(A) DRIVE SIGNAL WAVEFORM (B) DET1

(C) DET2

(D) DIFFERENTIAL AMPLIFYING OUTPUT (A) DRIVE SIGNAL WAVEFORM
(B) OUTPUT AT ELETRODE 37
(C) DETECTION SIGNAL
(D) OUTPUT OF CIRCUIT 40

(A) DRIVE SIGNAL WAVEFORM
(B) DETECTION SIGNAL
(C) OUTPUT OF CIRCUIT 43

(A) OUTPUT AT ELECTRODE 37
(B) OUTPUT OF CIRCUIT 43
(C) OUTPUT OF CIRCUIT 40

(A) DRIVE SIGNAL WAVEFORM
(B) OUTPUT OF CIRCUIT 40
(C) OUTPUT OF CIRCUIT 43

(A) DRIVE SIGNAL WAVEFORM
(B) DET1
(C) DET2
(C) OUTPUT OF CIRCUIT 46

(A) DRIVE SIGNAL WAVEFORM
(B) DET1
(C) DET2
(D) OUTPUT OF CIRCUIT 51
(E) OUTPUT OF CIRCUIT 52

(A) OUT OUT OF CIRCUIT 51
(B) OUTPUT OF CIRCUIT 52
(C) OUTPUT OF CIRCUIT 46

DETECTION CIRCUIT FOR VIBRATORY GYRO AND VIBRATORY GYRO DEVICE USING THE SAME

BACKGROUND OF THE INVENTION

1. Field of the Invention

The present invention generally relates to a gyro for detecting angular velocity, and more particularly to a tuning-fork type vibratory gyro using a piezoelectric substance and a detection circuit (sensor) which processes an output signal of the vibratory gyro.

A gyroscope has been used to identify the current position of a vehicle such as an airplane, a ship or a satellite. Recently, a gyroscope has been applied to devices for personal use, such as car navigation and vibration detection in video cameras and still cameras.

A piezoelectric vibratory gyro utilizes the effect in which when an angular velocity is applied to the gyro which is being vibrated, a Coriolis force is produced in a direction perpendicular to the direction in which the gyro is vibrated. Various types of piezoelectric vibratory gyro have been proposed. Recently, a tuning-fork type vibratory gyro has been attracted because it has relatively high cost performance. Particularly, there have been considerable activities in the development of a tuning-fork type vibratory gyro utilizing a piezoelectric single crystal.

Such tuning-fork type vibratory gyros utilizing a piezoelectric single crystal are proposed in, for example, U.S. Pat. Nos. 5,329,816 and 5,251,483. The U.S. Pat. No. 5,329,816 discloses a tuning-fork type vibratory gyro (gyro element) utilizing a piezoelectric single crystal shaped so that two arms and a base supporting the arms are integrally formed. Drive electrodes for driving a tuning-fork vibration are provided to one of the two arms, and detection electrodes are provided to the other arm in order to detect a voltage based on the angular velocity applied to the gyro.

FIGS. 1A and 1B show a tuning-fork type vibratory gyro having an electrode arrangement as described above. The gyro includes a tuning fork made of a piezoelectric single crystal, such as $LiTaO_3$ or $LiNbO_3$. The tuning fork has two arms 11 and 12, and a base 13 which integrally connects the arms 11 and 12 together. As shown in FIG. 1B, drive electrodes 14–17 are attached to the arm 11, and detection electrodes 18 and 19 are attached to the arm 12. A drive source 20, which generates a rectangular wave signal, is connected to the electrodes 14–17. A detection signal (voltage) depending on the angular velocity is output across the detection electrodes 18 and 19.

U.S. Pat. No. 5,251,483 has a piezoelectric tuning-fork type vibratory gyro having an electrode arrangement different from that of the gyro shown in FIGS. 1A and 1B. The gyro disclosed in U.S. Pat. No. 5,251,483 has detection electrodes attached to two arms. Generally, such an electrode arrangement is called a differential-type structure. The detection electrodes disclosed in U.S. Pat. No. 5,251,483 are provided to four or three surfaces of each of the two arms.

A vibratory gyro having the electrode arrangement as described above is shown in FIGS. 2A and 2B. Electrodes 14–17 and 25 are provided to the arm 11, and electrodes 21–24 and 26 are provided to the arm 12. The electrodes 15, 17, 21 and 23 function as drive electrodes, and electrodes 14, 16, 22, 24, 25 and 26 function as detection electrodes. As shown in FIG. 2B, two detection signals DET1 and DET2 are obtained, and the potential difference between the detection signals DET1 and DET2 corresponds to the angular velocity applied to the gyro.

FIG. 3 shows an operation of the gyros shown in FIGS. 1A, 1B, 2A and 2B. When the drive signal (voltage) generated by the drive source is applied to the drive electrodes, the two arms 11 and 12 are vibrated in the X directions. When the vibratory gyro is rotated about the Z axis, the two arms 11 and 12 are vibrated in the Y directions perpendicular to the X directions. The magnitude of the vibrations of the arms 11 and 12 in the Y directions is proportional to the Coriolis force, which is proportional to the angular velocity. Hence, a signal (a detection signal) proportional to the vibrations of the arms 11 and 12 in the Y directions reflect the value of the angular velocity applied to the gyro.

A detection circuit is provided which senses the detection signal. A detection circuit 27 shown in FIG. 4 is used for the vibratory gyro in which the drive electrodes are attached to one of the two arms 11 and 12 and the detection electrodes are provided to the other one of the arms 11 and 12. The detection signal from the vibratory gyro is applied to a synchronous detection circuit 31 via a phase adjustment circuit (not shown). The synchronous detection circuit 31 performs a synchronous detection in which a drive signal output by a drive circuit 30 is used as a reference signal for synchronous detection. A resultant signal derived from the synchronous detection circuit 31 is applied to a differential amplifier 32 via a smoothing circuit (not shown). The differential amplifier 32 performs a differential amplifying operation between the synchronous detection output and an offset voltage produced by an offset adjustment circuit 29 supplied with a power supply voltage 28. The above differential amplifying operation results in first and second output signals OUT1 and OUT2. The value of the voltage difference between the first output signal OUT1 and the second output signal OUT2 indicates the value of the angular velocity applied to the gyro, and the sign of the voltage difference indicates the direction of the rotation.

FIG. 5 shows a detection circuit 33 for use in the gyro having the electrode arrangement shown in FIGS. 2A and 2B. The detection signals DET1 and DET2 are applied to a differential amplifier 34, which performs a differential amplifying operation thereon. An output signal of the differential amplifier 34 is compared with the offset voltage by the differential amplifier circuit 32 used in the structure shown in FIG. 4. The differential amplifier 32 results in first and second output signals OUT1 and OUT2.

The detection signals DET1 and DET2 are subjected to the differential amplifying operation, so that leakage voltage which may be included in the detection signals DET1 and DET2 can be canceled. It should be noted that the gyro produces no detection signals if the gyro does not receive any angular velocity. However, the gyro may slightly produce detection signals irrespective of the gyro does not receive any angular velocity. Such detection signals are leakage voltages or signals.

FIG. 6 shows factors which cause the leakage voltage. The factors can be categorized in three groups. The first group of factors is called an electro-magnetic coupling leakage and is due to a surplus component of force coefficients caused by an unbalanced situation of the electrodes (errors in the size of electrodes and/or positions thereof). The electro-magnetic coupling leakage includes a leakage on the drive side and a leakage on the detection side. The second group of factors is called an electrostatic coupling leakage and is due to an electrostatic coupling capacitance between the input and output sides, that is, between the drive-side electrodes and the detection-side electrodes. The third group of factors is called a mechanical coupling leakage and is due to a mechanical coupling between the drive-side vibration and the detection-side vibration.

It may be possible to reduce the leakage voltages due to any of the first through third groups of factors by means of complex and troublesome works. For example, the electrodes are finely formed and finely positioned. If a positional error of an electrode happens, the electrode is cut off, for example. Alternatively or additionally, as shown in FIGS. 7A and 7B, a corner portion 35 of one or both of the arms 11 and 12 is cut off in order to change the moment of at least one of the arms 11 and 12 and thus reduce an unwanted vibration.

However, in practice, it is very difficult to greatly reduce the leakage, preferably to zero, whereas the above adjustment works are complex and troublesome. For example, in the gyro of the type shown in FIGS. 1A and 1B, the leakage voltage is, as shown in part (B) of FIG. 8, step portions in a sin wave of the detection signal which has the 90° out-of-phase with the drive signal which is a continuous rectangular wave signal shown in part (A) of FIG. 8. The step portions are caused by the electrostatic coupling leakage. The sine wave of the detection signal is also caused by a leakage due to the electro-mechanical coupling leakage.

FIG. 9 shows the operation of the gyro of the type shown in FIGS. 2A and 2B. As shown in parts (B) and (C) of FIG. 9, the detection signals DET1 and DET2 include respective electrostatic coupling leakage components having different magnitudes and respective sin-wave leakage components having different magnitudes. A sine-wave component remains by the differential amplifying operation on the detection signals DET1 and DET2, while the electrostatic coupling leakages can be canceled, as shown in part (D) of FIG. 9. If it is attempted to cancel the sin-wave leakage components, an unwanted component due to the electrostatic coupling remains in the output signal of the differential amplifying operation. It can be seen from the above that a simple differential amplifying operation cannot completely eliminate the leakage components. Further, a leakage voltage obtained when the gyro does not receive any angular velocity degrades the resolution of the gyro.

SUMMARY OF THE INVENTION

It is a general object of the present invention to provide a detection circuit and a gyro device using the same, in which the above disadvantages are eliminated.

A specific object of the present invention is to reduce the leakage components by improving the detection circuit rather than the complex and troublesome works and to thus improve the resolution and productivity of the gyro.

The above objects of the present invention are achieved by a detection circuit for a vibratory gyro comprising: a first circuit which detects a detection signal output from the vibratory gyro and produces an output signal indicative of an angular velocity applied to the vibratory gyro; and a second circuit which is operatively coupled to the first circuit and reduces a leakage component included in the detection signal.

The detection circuit may be configured so that the second circuit includes a circuit part which reduces at least one of an electro-mechanical coupling leakage directed from a drive side of the vibratory gyro to a detection side thereof and an electrostatic coupling leakage directed from the drive side of the vibratory gyro to the detection side thereof.

The detection circuit may be configured so that the second circuit includes a differential amplifier circuit which performs a differential amplifying operation on the detection signal and a signal obtained at a first drive electrode which is paired with a second drive electrode to which a drive signal is applied, so that an electro-mechanical coupling leakage included in the detection signal can be reduced.

The detection circuit may be configured so that the second circuit includes an adder circuit which adds a drive signal applied to the vibratory gyro and the detection signal, so that an electrostatic coupling leakage included in the detection signal can be reduced.

The detection circuit may be so that: the detection signal includes a first detection signal and a second detection signal; and the second circuit includes a differential amplifier circuit which performs a differential amplifying operation on the first and second detection signals, so that electro-mechanical coupling leakages included in the first and second detection signals can be reduced.

The detection circuit may be configured so that: the detection signal includes a first detection signal and a second detection signal; and the second circuit includes an adder circuit which adds the first and second detection signals, so that electro-mechanical coupling leakages included in the first and second detection signals can be reduced.

The detection circuit may be configured so that the second circuit includes: an adder circuit which adds a drive signal applied to the vibratory gyro and the detection signal; and a differential amplifier circuit which performs a differential amplifying operation on an output signal of the adder circuit and a signal obtained at a first electrode which is paired with a second electrode to which the drive signal is applied.

The detection circuit may be configured so that the second circuit includes: a differential amplifier circuit which performs a differential amplifying operation on the detection signal and a signal obtained at a first electrode which is paired with a second electrode to which a drive signal is applied; and an adder circuit which adds an output signal of the differential amplifier circuit and the drive signal applied to the second electrode of the vibratory gyro.

The detection circuit may be configured so that: the detection signal includes a first detection signal and a second detection signal; and the second circuit includes an adder circuit which adds a drive signal applied to the vibratory gyro and the first and second detection signals, and a differential amplifier circuit which performs a differential amplifying operation on two output signals of the adder circuit.

The detection circuit may be configured so that: the detection signal includes a first detection signal and a second detection signal; and the second circuit includes a differential amplifier circuit which performs a differential amplifying operation on the first and second detection signals, and an adder circuit which adds a drive signal applied to the vibratory gyro and an output signal of the differential amplifying circuit.

The above objects of the present invention are also achieved by a vibratory gyro device comprising: a vibratory gyro; and a detection circuit including a first circuit which detects a detection signal output from the vibratory gyro and produces an output signal indicative of an angular velocity applied to the vibratory gyro, and a second circuit which is operatively coupled to the first circuit and reduces a leakage component included in the detection signal.

BRIEF DESCRIPTION OF THE DRAWINGS

Other objects, features advantages of the present invention will become more apparent from the following detailed description when read in conjunction with the accompanying drawings, in which.

DETAILED DESCRIPTION

The present invention can be outlined as follows. A differential amplifier is provided which functions to reduce the electro-mechanical coupling leakage. An adder circuit is provided which functions to reduce the electrostatic coupling leakage. The above differential amplifier can be applied to both the gyro shown in FIGS. 1A and 1B and the gyro shown in FIGS. 2A and 2B. Similarly, the adder circuit can be applied to both the gyro shown in FIGS. 1A and 1B and the gyro shown in FIGS. 2A and 2B.

Figure 1A:
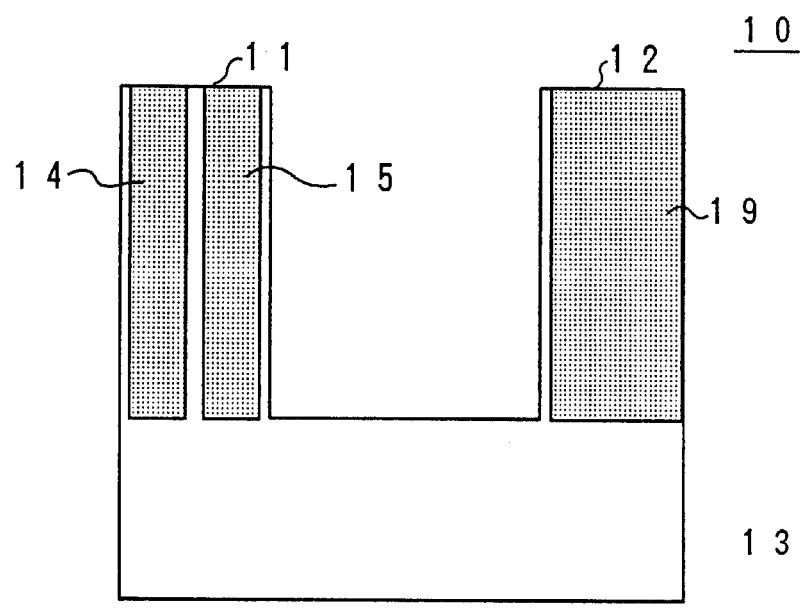
FIG. 1A is a front view of a conventional tuning-fork type vibratory gyro.
Figure 1B:
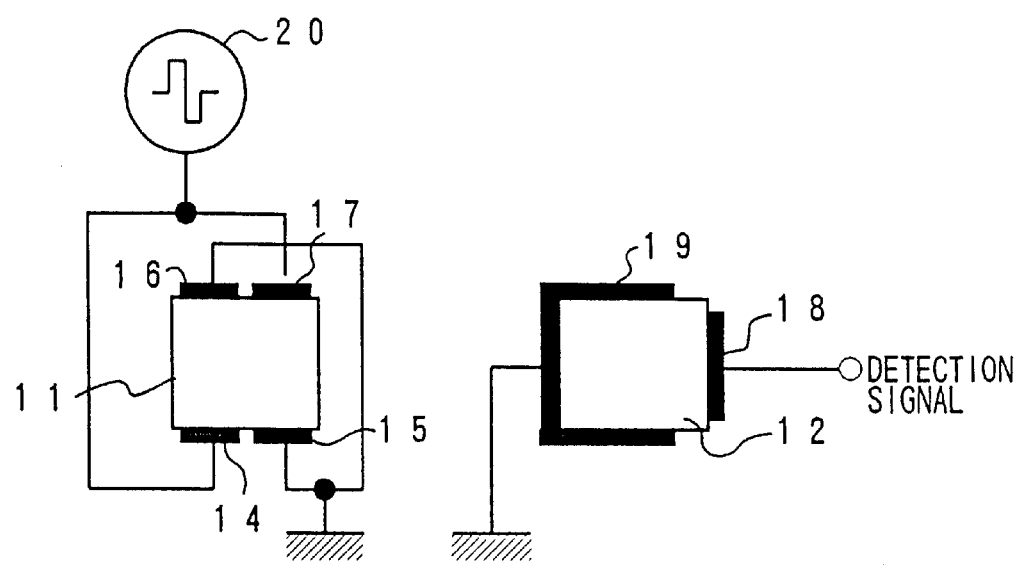
FIG. 1B is a diagram which shows an arrangement of electrodes provided to arms of the gyro shown in FIG. 1A.

FIGS. 10, 11, 12 and 13 are diagrams of vibratory gyro devices which respectively utilize the vibratory gyro having the electrode arrangement shown in FIGS. 1A and 1b.

First, a description will be given, with reference to FIG. 10, of a vibratory gyro device according to a first embodiment of the present invention. The vibratory gyro device shown in FIG. 10 has a feature in which a differential amplifier is provided in order to reduce the electro-mechanical coupling leakage due to the surplus component of the force coefficient on the drive side.

Figure 10:
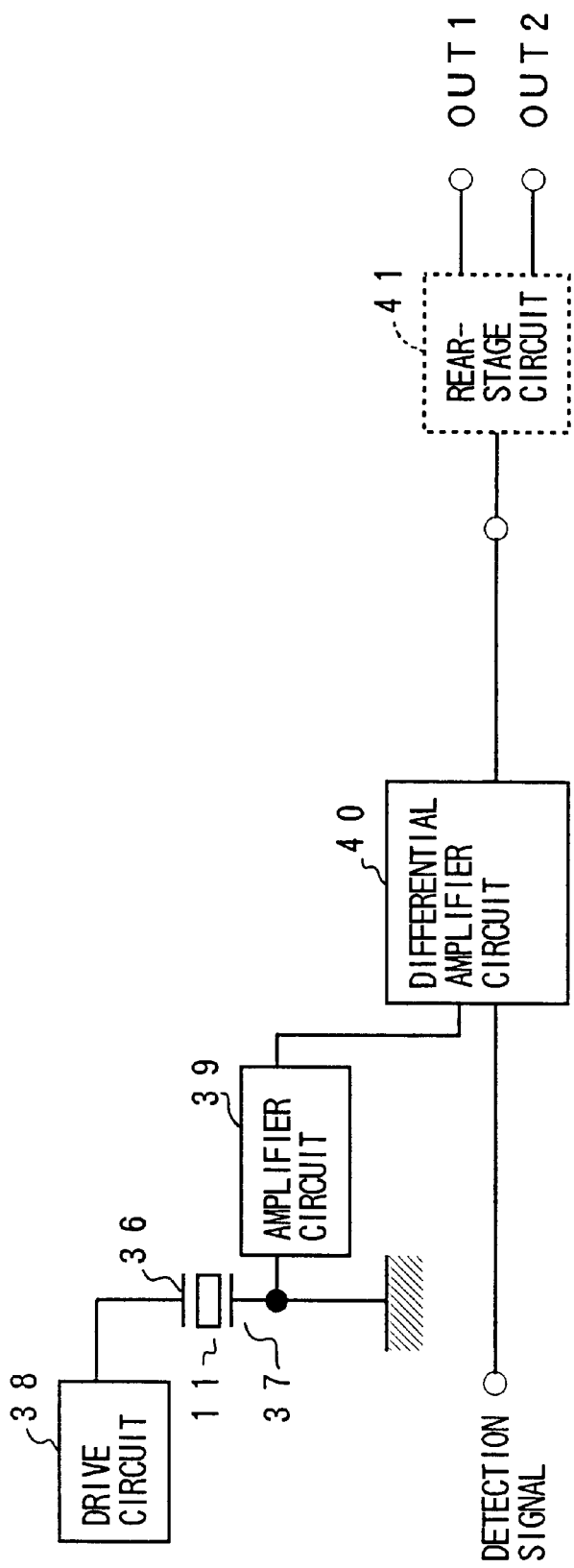
FIG. 10 is a block diagram of a first embodiment of the present invention.

In FIG. 10, an electrode 36 corresponds to the electrodes 14 and 17 shown in FIGS. 1A and 1B, and an electrode 37 corresponds to the electrodes 15 and 16 shown therein. A drive circuit 38 includes the drive source 20 shown in FIG. 1B. The electrode 37 is connected to one of two inputs of a differential amplifier circuit 40 via an amplifier circuit 39. A signal obtained at the electrode 37 is applied to the differential amplifier circuit 40 via the amplifier circuit 39. The signal obtained at the electrode 37 is a sine-wave signal which is in phase with the drive signal (continuous rectangular wave) generated by the drive circuit 38. The sin-wave signal obtained at the electrode 37 is amplified by the amplifier circuit 39 which has an appropriate amplifying factor (which will be described later).

The detection signal obtained across the detection electrodes attached to the arm 12 is applied to the other input terminal of the differential amplifier circuit 40. The detection signal is a sin-wave signal. As has been described previously, there is a 90° phase difference between the detection signal and the signal obtained at the electrode 37. In order to establish the in-phase relationship (no phase difference) between the detection signal and the signal obtained at the electrode 37, a phase adjustment circuit is used to adjust the phase of at least one of the two signals to pull the signals into the in-phase state. Such a phase adjustment circuit will be described later.

The differential amplifier circuit 40 performs a differential amplifying operation on the two input signals, and outputs a resultant signal to a rear-stage circuit 41. As will be described later, the rear-stage circuit 41 includes the aforementioned offset adjustment circuit 29, the synchronous detection circuit 31 and the differential amplifier 32.

Figure 7A:
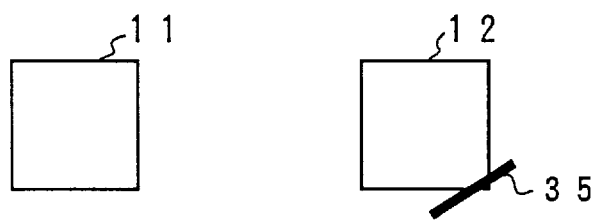
FIGS. 7A and 7B are diagrams of a method for reducing a leakage voltage.
Figure 7B:
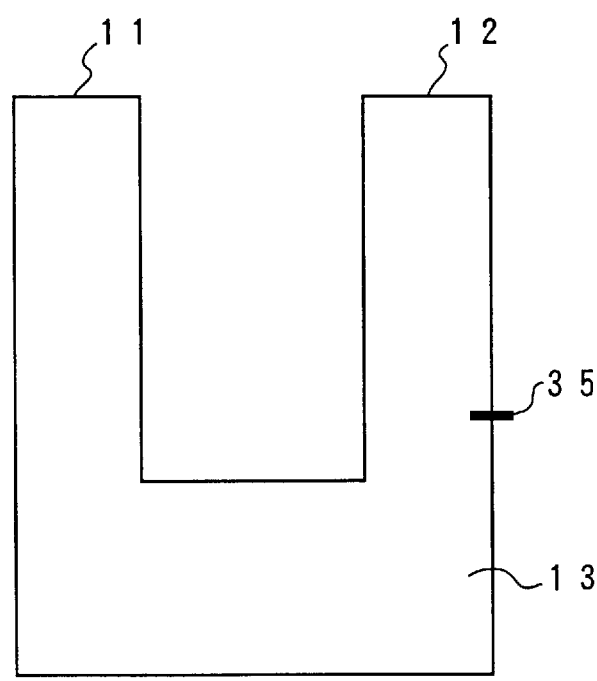
Figure 9:
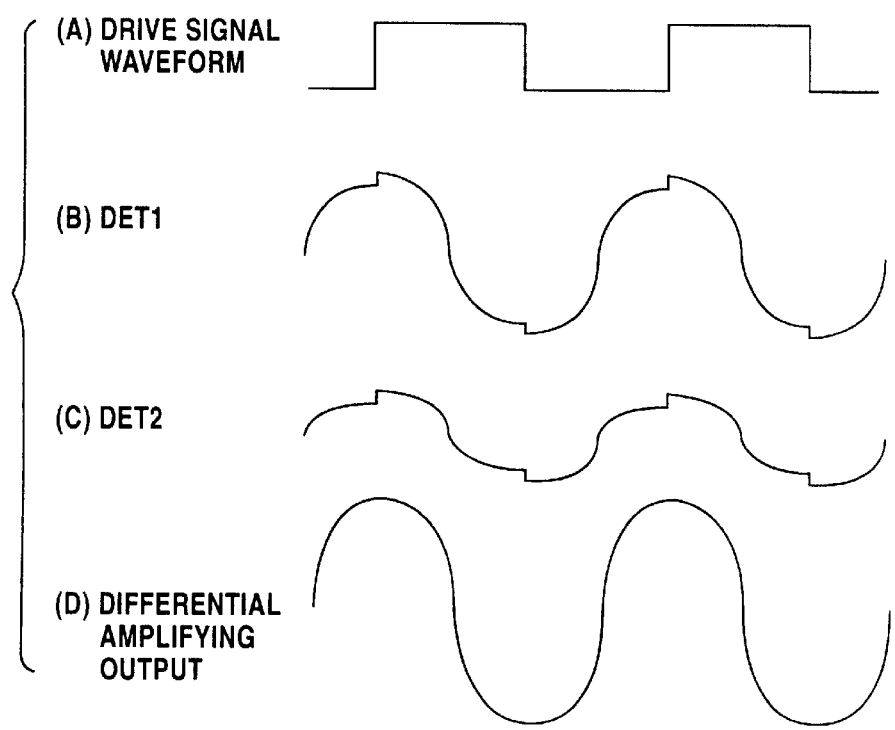
FIG. 9 is a waveform diagram which illustrates how the detection signals of the gyro shown in FIGS. 2A and 2B are affected by leakage factors.
Figure 14:
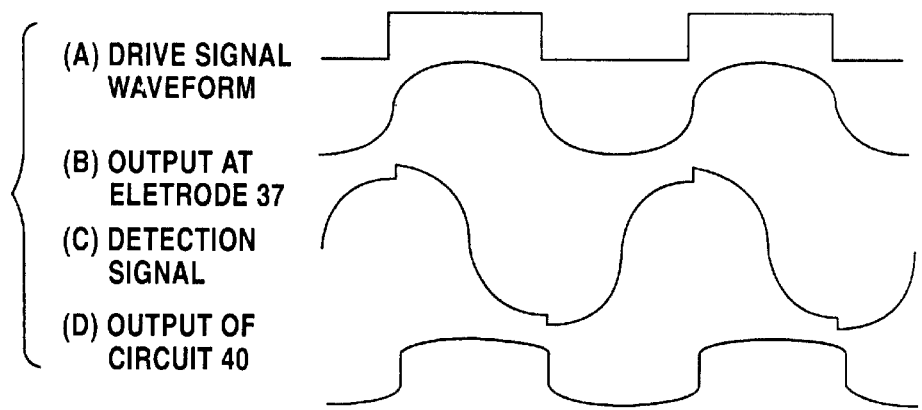
FIG. 14 is a waveform diagram of an operation of the first embodiment of the present invention.

FIG. 14 is a waveform diagram which shows an operation of the vibratory gyro device shown in FIG. 10. The drive circuit 38 applies the continuous rectangular wave drive signal (shown in (A) of FIG. 14) to the electrode 36. The amplifier 39 amplifies the sin-wave signal obtained at the electrode 37. The amplifying factor of the amplifier circuit 39 is determined so that a sin-wave component contained in the detection signal (shown in (B) of FIG. 14) applied to the differential amplifier circuit can be canceled. Thus, as shown in (D) of FIG. 14, the output signal of the differential amplifier circuit 40 does not substantially contain any sin-wave component. The output signal of the differential amplifier circuit 40 has a rectangular wave in which an electrostatic coupling leakage remains. However, since the output signal of the differential amplifier circuit 40 does not substantially contain any sin-wave component, the electro-mechanical coupling leakage on the drive side can be greatly reduced. It should be noted that a sin-wave component slightly included in the output signal of the differential amplifier circuit 40 is basically a mechanical coupling leakage, which can be reduced by the method shown in FIGS. 7A and 7B, if desired.

Figure 11:
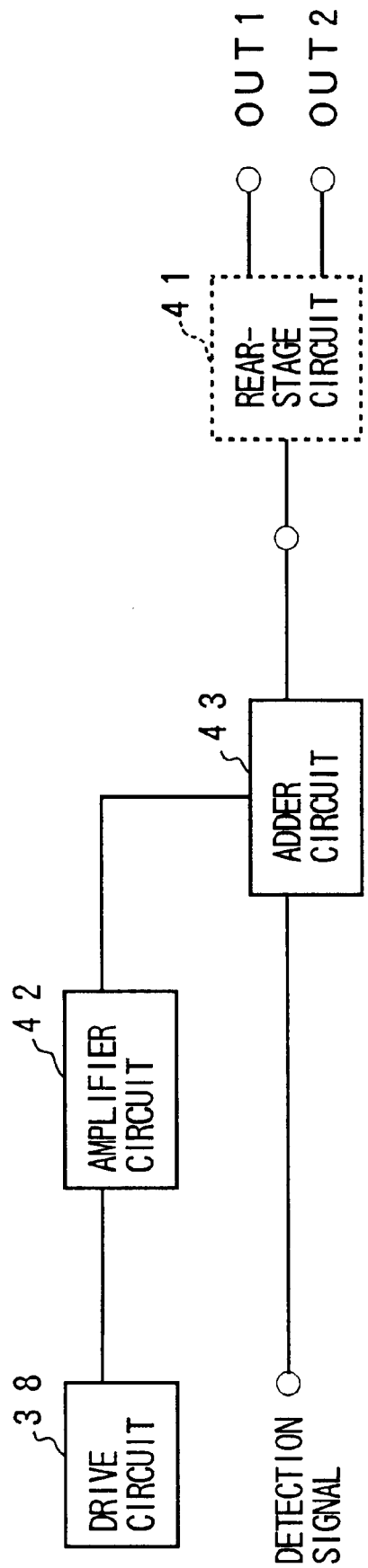
FIG. 11 is a block diagram of a second embodiment of the present invention.
Figure 15:
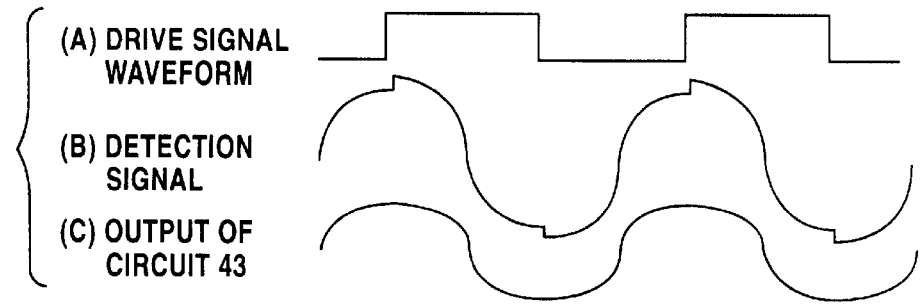
FIG. 15 is a waveform diagram of an operation of the second embodiment of the present invention.

FIG. 11 shows a vibratory gyro device according to a second embodiment of the present invention. In FIG. 11, parts that are the same as those shown in FIG. 10 are given the same reference numbers. The second embodiment of the present invention has a feature in which an adder circuit is provided in order to reduce the electrostatic coupling leakage. The drive signal (continuous rectangular wave) output by the drive circuit 38 is amplified by the amplifier circuit 42 with an appropriate amplifying factor, and is then applied to an adder circuit 43. The adder circuit 43 receives the detection signal from the gyro, and adds it to the amplified signal from the amplifier circuit 42. It is necessary to invert either the output signal of the amplifier circuit 42 or the detection signal in order to cancel the electrostatic coupling leakage. By setting the amplifying factor of the amplifier circuit 42 to an appropriate value, step portions included in the detection signal and corresponding to the electrostatic coupling leakage (shown in (B) of FIG. 15) can be canceled, so that the output signal of the adder circuit 43 substantially includes a sin-wave component only, as shown in (C) of FIG. 15. The output signal of the adder circuit 43 is processed by the rear-stage circuit 41. A mechanical coupling leakage contained in the output signal of the adder circuit 43 can be reduced by the method shown in FIGS. 7A and 7B, if desired.

Figure 12:
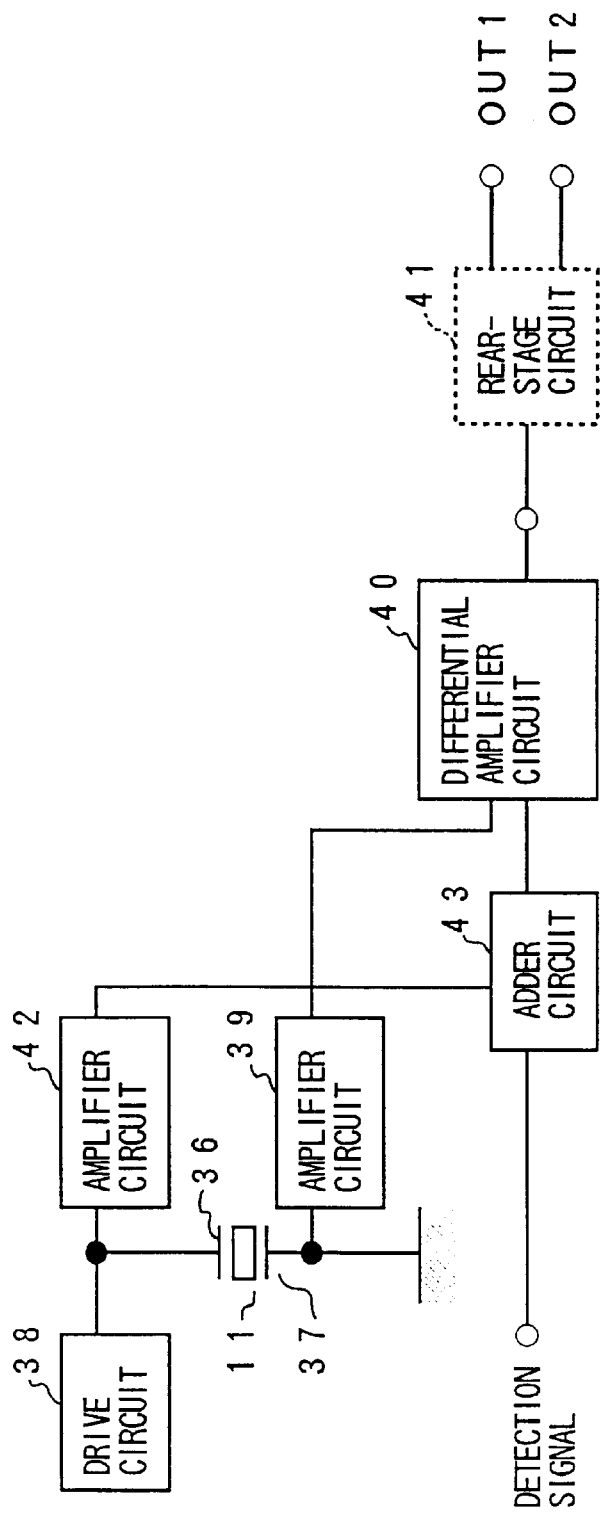
FIG. 12 is a block diagram of a third embodiment of the present invention.
Figure 16:
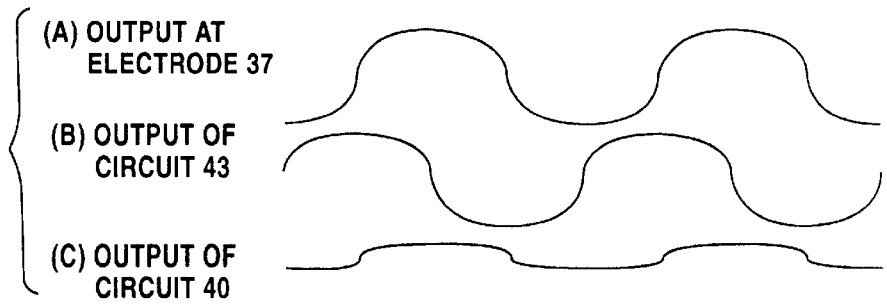
FIG. 16 is a waveform diagram of an operation of the third embodiment of the present invention.

FIG. 12 shows a vibratory gyro device according to a third embodiment of the present invention, in which parts that are the same as those shown in the previously described figures are given the same reference numbers. FIG. 16 is a waveform diagram of an operation of the third embodiment of the present invention. The vibratory gyro device shown in FIG. 12 corresponds to a combination of the structures shown in FIGS. 10 and 11. The output signal of the adder circuit 43 is applied to the differential amplifier circuit 40. As has been described previously, the output signal of the adder circuit 43 is a sin-wave signal, as shown in (B) of FIG. 16. Also, as has been described, the output signal of the amplifier circuit 39 is a sin-wave signal. At least one of the sin-wave signals is subjected to a phase adjustment process. The differential amplifying operation is carried out by the differential amplifier circuit 40. Hence, it is possible to reduce, in the output signal of the differential amplifier 40, the electrostatic coupling leakage and the drive-side electro-mechanical coupling leakage, as shown in (C) of FIG. 16. It should be noted that the output signal of the differential amplifier circuit 40 may include a sin-wave component based on the mechanical coupling leakage, which can be reduced by the way shown in FIGS. 7A and 7B.

Figure 13:
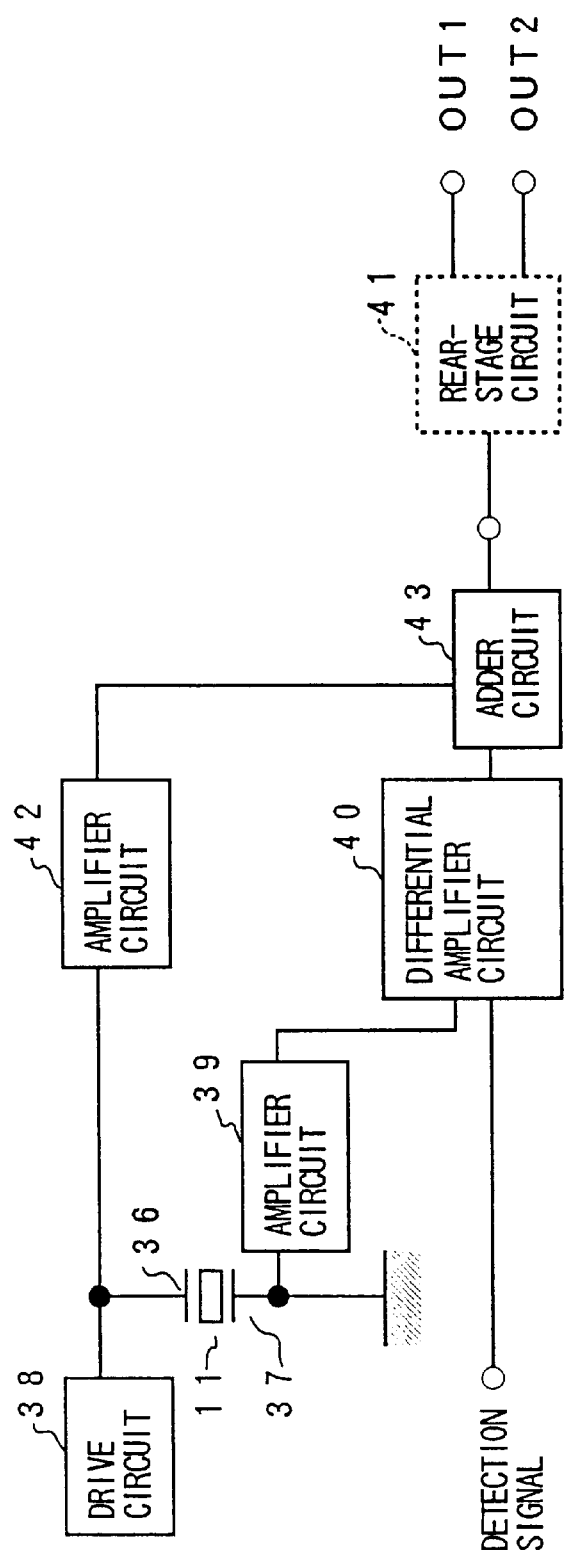
FIG. 13 is a block diagram of a fourth embodiment of the present invention.
Figure 17:
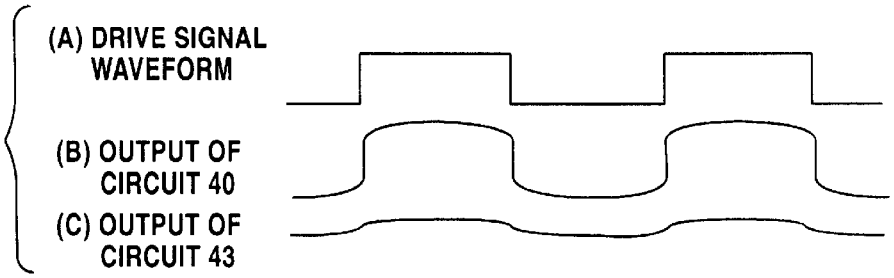
FIG. 17 is a waveform diagram of an operation of the fourth embodiment of the present invention.

FIG. 13 shows a vibratory gyro device according to a fourth embodiment of the present invention, in which parts that are the same as those shown in the previously described figures are given the same reference numbers. FIG. 17 is a waveform diagram of an operation of the fourth embodiment of the present invention. The vibratory gyro device shown in FIG. 12 corresponds to another combination of the structures shown in FIGS. 10 and 11. The adder circuit 43 adds the output signal of the differential amplifier circuit 40 and the output signal of the amplifier circuit 42. As has been described previously, the output signal of the differential amplifier circuit 40 is a sin-wave signal, as shown in (B) of FIG. 17. Also, as has been described, the output signal of the amplifier circuit 42 is a sin-wave signal, as shown in (C) of FIG. 17. The phase of at least one of the output signals shown in (B) and (C) of FIG. 17 is subjected to a phase adjustment process. Then, the output signal of the differential amplifier circuit 40 and the output signal of the amplifier circuit 42 are added by the adder circuit 43. Hence, it is possible to reduce, in the output signal of the adder circuit 43, the electrostatic coupling leakage and the drive-side electro-mechanical coupling leakage, as shown in (C) of FIG. 17. It should be noted that the output signal of the adder circuit 43 may include a sin-wave component based on the mechanical coupling leakage, which can be reduced by the way shown in FIGS. 7A and 7B.

Various variations of the structures shown in FIGS. 10 through 13 can be made. For example, an amplifier circuit which amplifies the detection signal can be provided in any of the structures shown in FIGS. 10 through 13.

Figure 2A:
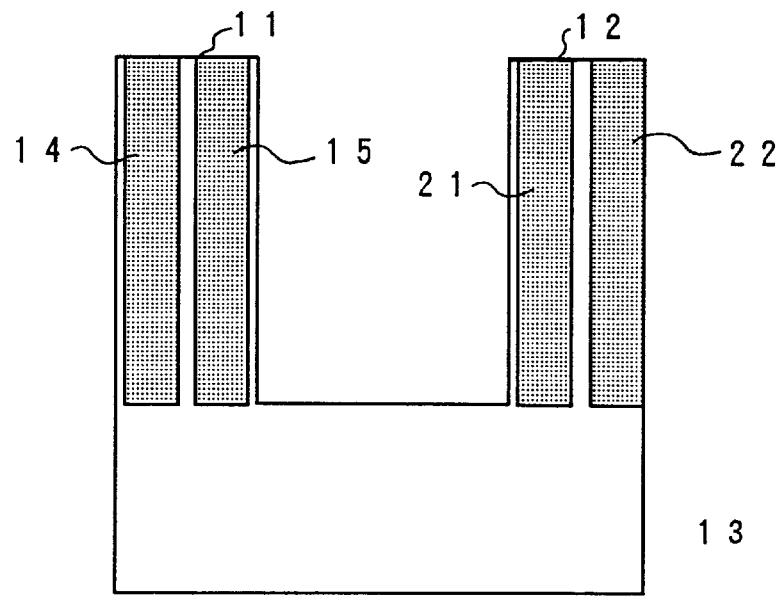
FIG. 2A is a front view of another conventional tuning-fork type vibratory gyro.
Figure 2B:
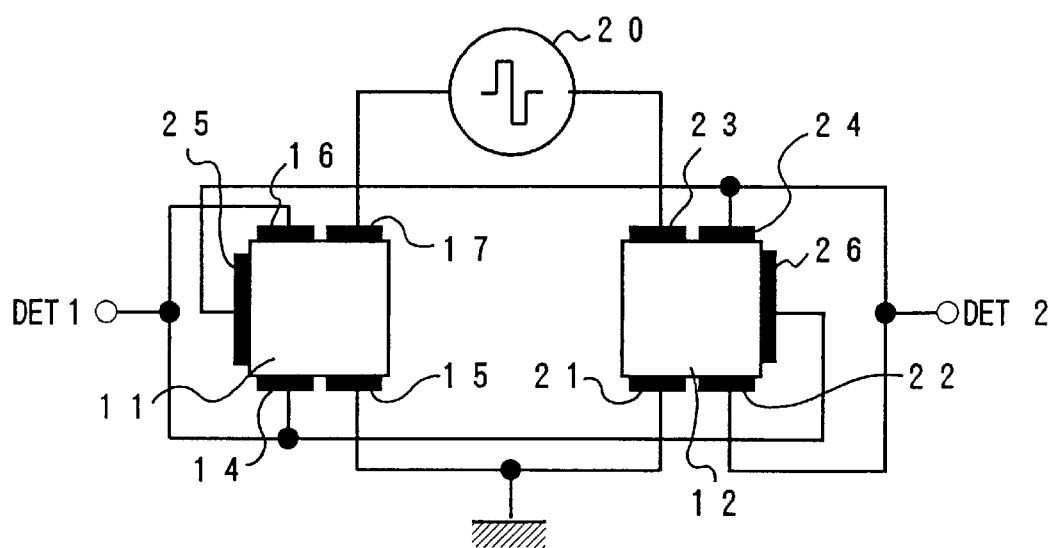
FIG. 2B is a diagram showing an arrangement of electrodes provided to arms of the gyro shown in FIG. 2A.
Figure 3:
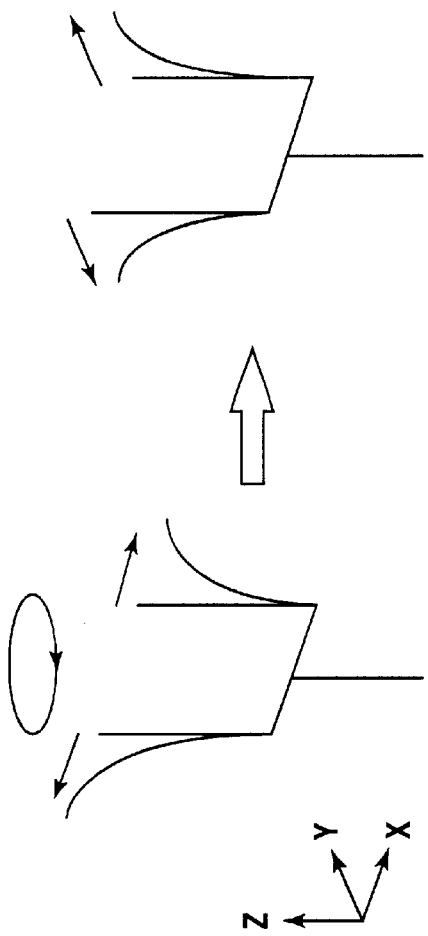
FIG. 3 is a diagram which illustrates an operation of the tuning-fork type vibratory gyro.
Figure 8:
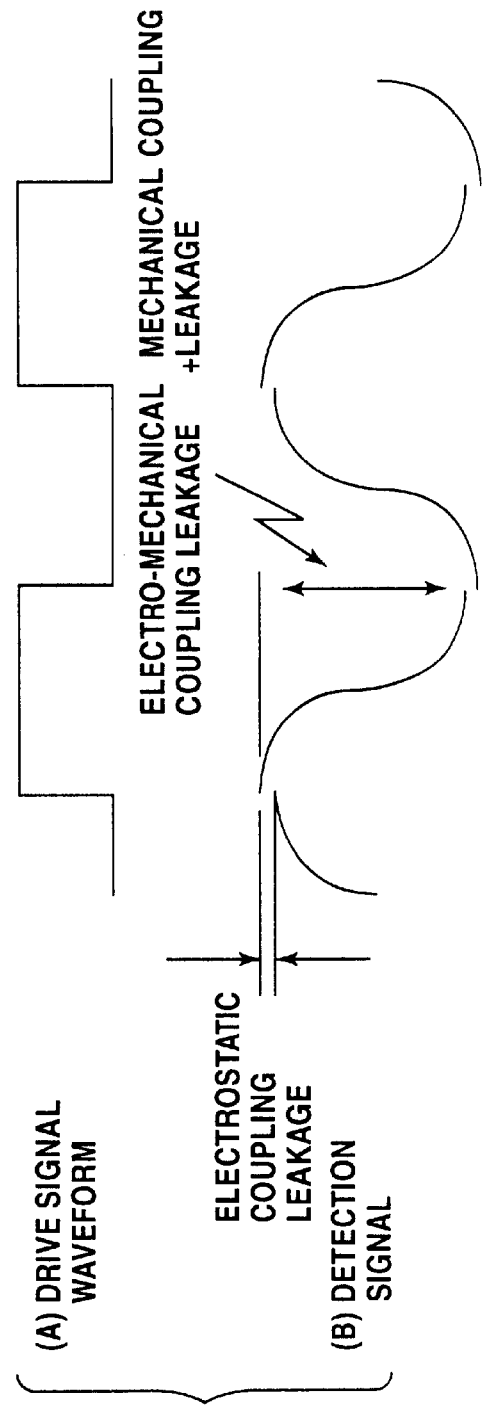
FIG. 8 is a waveform diagram which illustrates how the detection signal of the gyro shown in FIGS. 1A and 1B is affected by leakage factors.

A description will now be given of fifth through eighth embodiments of the present invention, which include the vibratory gyro having the electrode arrangement shown in FIGS. 2A and 2B.

Figure 18:
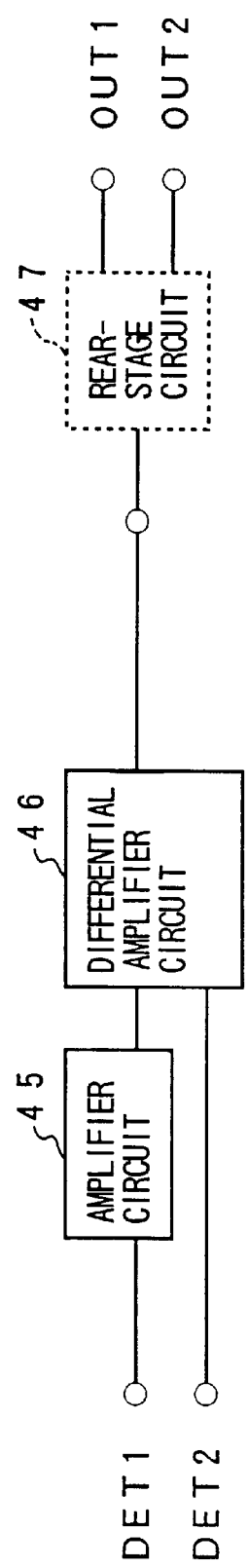
FIG. 18 is a block diagram of a fifth embodiment of the present invention.
Figure 22:
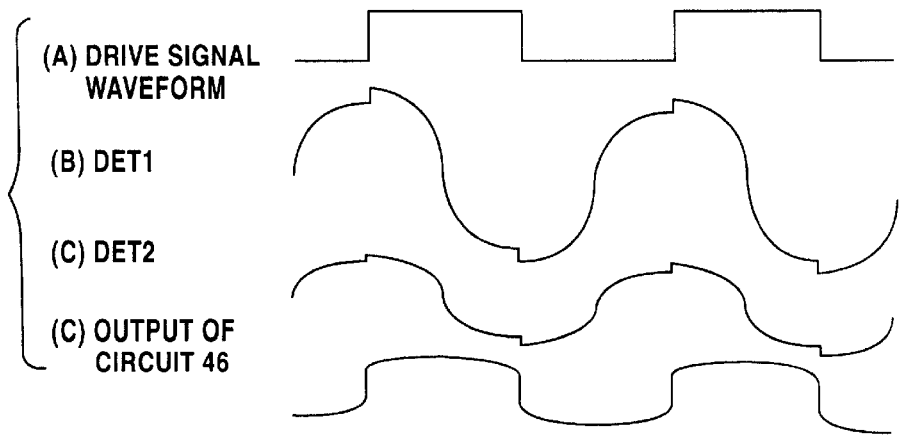
FIG. 22 is a waveform diagram of an operation of the fifth embodiment of the present invention.

FIG. 18 shows a vibratory gyro device according to the fifth embodiment of the present invention, which has a feature in which a differential amplifier circuit is provided which functions to reduce the electro-mechanical coupling leakage due to the surplus component of the force coefficient on the drive side. FIG. 22 is a waveform diagram showing the operation of the vibratory gyro device shown in FIG. 18.

As has been described previously, the vibratory gyro shown in FIGS. 2A and 2B produces the first detection signal DET1 ((B) of FIG. 22) and the second detection signal DET2 ((C) of FIG. 22). As shown in FIG. 18, the detection signal DET1 is amplified by an amplifier circuit 45 having an appropriate amplifying factor, and an amplified detection signal DET1 is applied to a differential amplifier circuit 46. The detection signal DET2 is applied to the differential amplifier circuit 46. By setting the amplifying factor of the amplifier circuit 45 to an appropriate value, it is possible to cancel the sin-wave components respectively contained in the detection signals DET1 and DET2 and to thus reduce the electro-mechanical coupling leakage on the drive side. As a result, a sin-wave component remaining in the output signal of the differential amplifier circuit 46 ((D) of FIG. 22) is based on the mechanical coupling leakage, which can be reduced by the way shown in FIGS. 7A and 7B. The output signal of the differential amplifier circuit 46 is subjected to the synchronous detection and amplifying processes in a rear-stage circuit 47.

Figure 19:
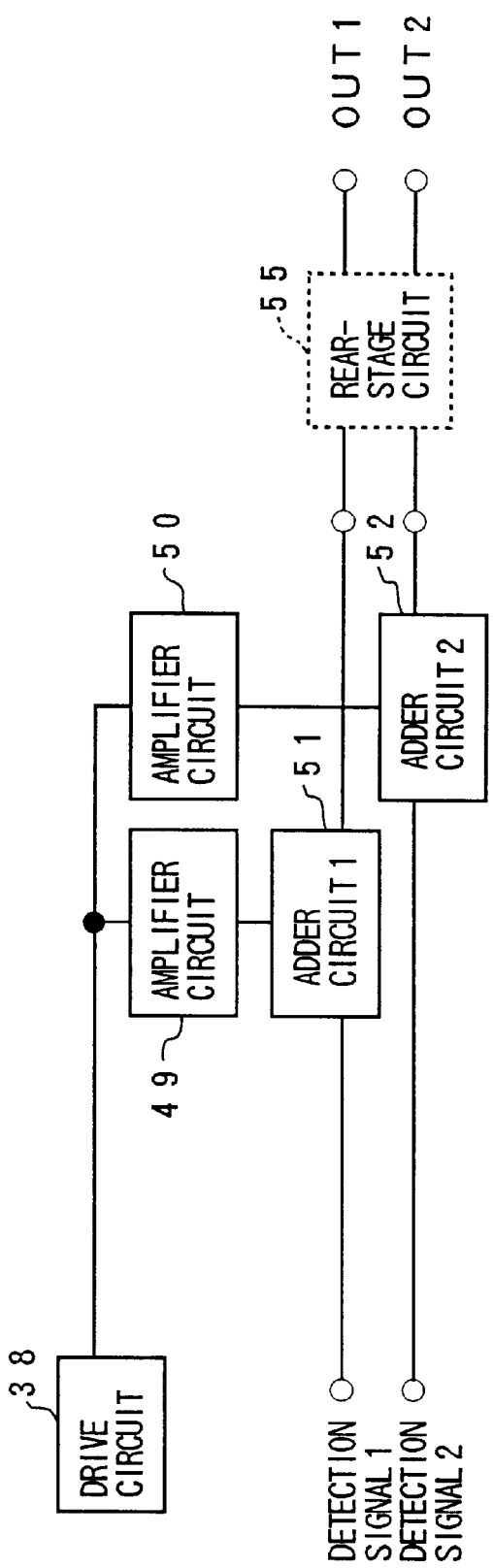
FIG. 19 is a block diagram of a sixth embodiment of the present invention.
Figure 23:
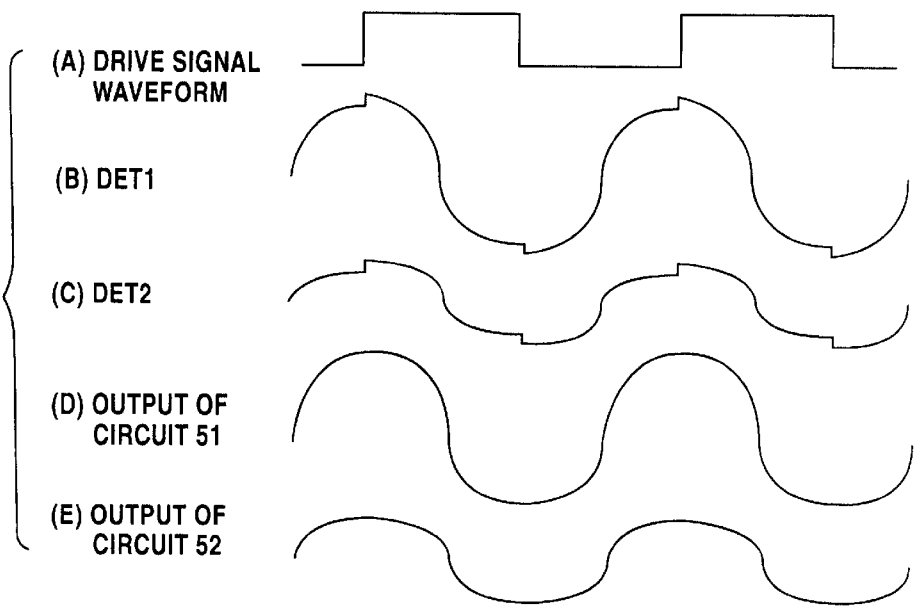
FIG. 23 is a waveform diagram of an operation of the sixth embodiment of the present invention.

FIG. 19 shows a vibratory gyro device according to a sixth embodiment of the present invention, in which parts that are the same as those shown in FIG. 18 are given the same reference numbers. FIG. 23 is a waveform diagram of the operation of the vibratory gyro device shown in FIG. 19.

The sixth embodiment of the present invention has a feature in which an adder circuit is provided in order to reduce the electrostatic coupling leakage.

Amplifier circuits 49 and 50 amplify the drive signal (a continuous rectangular wave shown in (A) of FIG. 23) from the drive circuit 38 with respective, appropriate amplifying factors. The drive signal amplified by the amplifier circuit 49 is applied to an adder circuit 51, which receives the detection signal DET1 shown in (B) of FIG. 23. The drive signal amplified by the amplifier circuit 50 is applied to an adder circuit 52, which receives the detection signal DET2 shown in (C) of FIG. 23. It should be noted that the amplified drive signals from the amplifier circuits 49 and 50 are subjected to the phase adjustment process in order to pull these amplified drive signals in phase with the detection signals DET1 and DET2, respectively.

The adder circuit 51 adds the detection signal DET1 and the amplified drive signal from the amplifier circuit 49, and results in an output signal as shown in (D) of FIG. 23. The adder circuit 52 adds the detection signal DET2 and the amplified drive signal from the amplifier circuit 50, and results in an output signal as shown in (E) of FIG. 23. As shown in (D) and (E) of FIG. 23, the output signals of the adders 51 and 52 have greatly reduced rectangular wave components. That is, the rectangular wave components contained in the detection signals DET1 and DET2 can be greatly reduced, so that the electrostatic coupling leakage can be greatly reduced. The output signals of the adders 51 and 52 basically include sin-wave components, which correspond to the electro-mechanical coupling leakages. A rear-stage circuit 55 performs a differential amplifying, synchronous detection, and amplifying operation on the output signals of the adder circuits 51 and 52.

Figure 20:
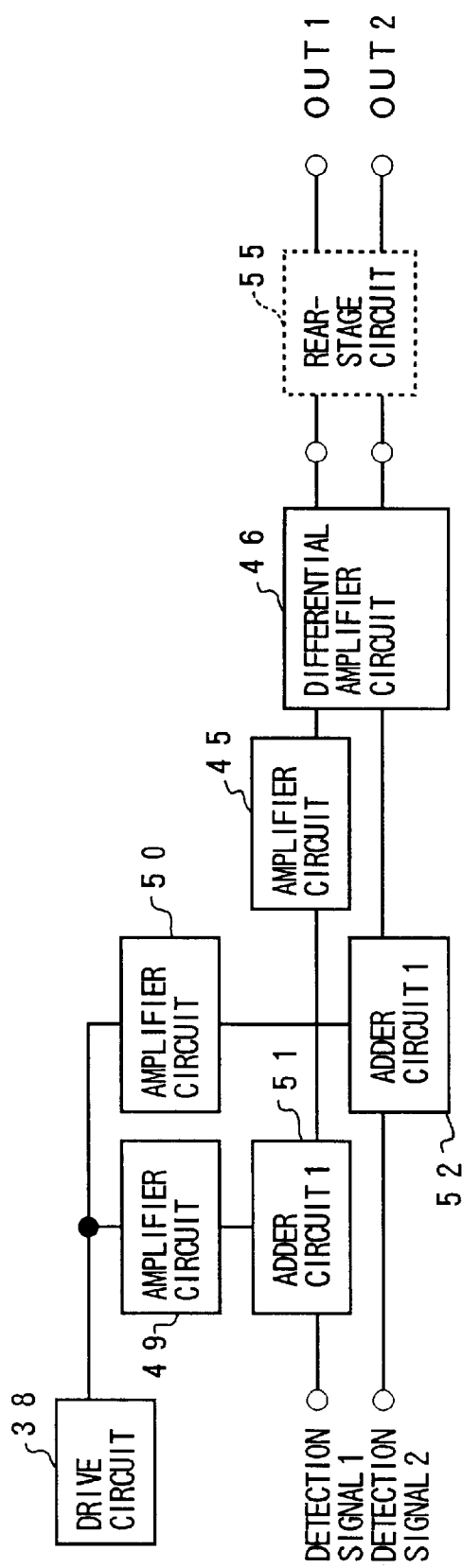
FIG. 20 is a block diagram of a seventh embodiment of the present invention.
Figure 24:
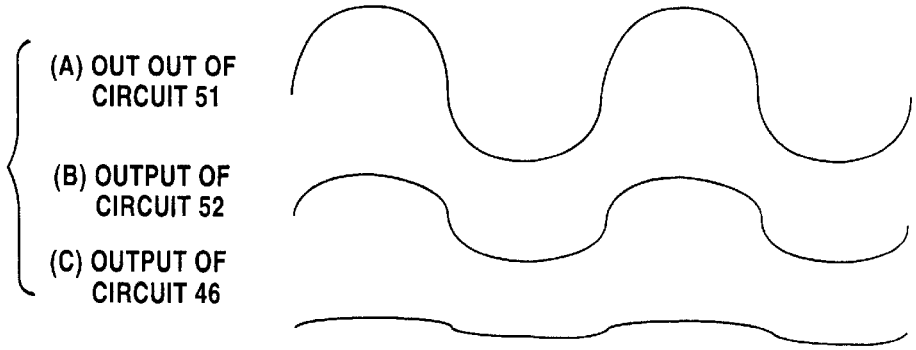
FIG. 24 is a waveform diagram of an operation of the seventh embodiment of the present invention.

FIG. 20 shows a vibratory gyro device according to a seventh embodiment of the present invention, in which parts that are the same as those shown in the previously described figures are given the same reference numbers. The vibratory gyro device shown in FIG. 20 corresponds to a combination of the structures shown in FIGS. 18 and 19. FIG. 24 is a waveform diagram of the operation of the vibratory gyro device shown in FIG. 20.

As has been described previously with reference to FIG. 19, the output signals of the adder circuits 51 and 52 are sin-wave components, in which the electrostatic coupling leakages are already reduced. The output signal of the adder circuit 51 is amplified by the amplifier circuit 45 with an appropriate factor. The differential amplifier circuit 46 performs the differential amplifying operation on the output signal of the amplifier circuit 45 and the output signal of the adder circuit 52. Hence, it is possible to reduce the electro-mechanical coupling leakage on the drive side. A sin-wave component remaining in the output signal of the differential amplifier circuit 46 is based on the mechanical coupling leakage, and can be canceled by the way shown in FIGS. 7A and 7B.

Figure 21:
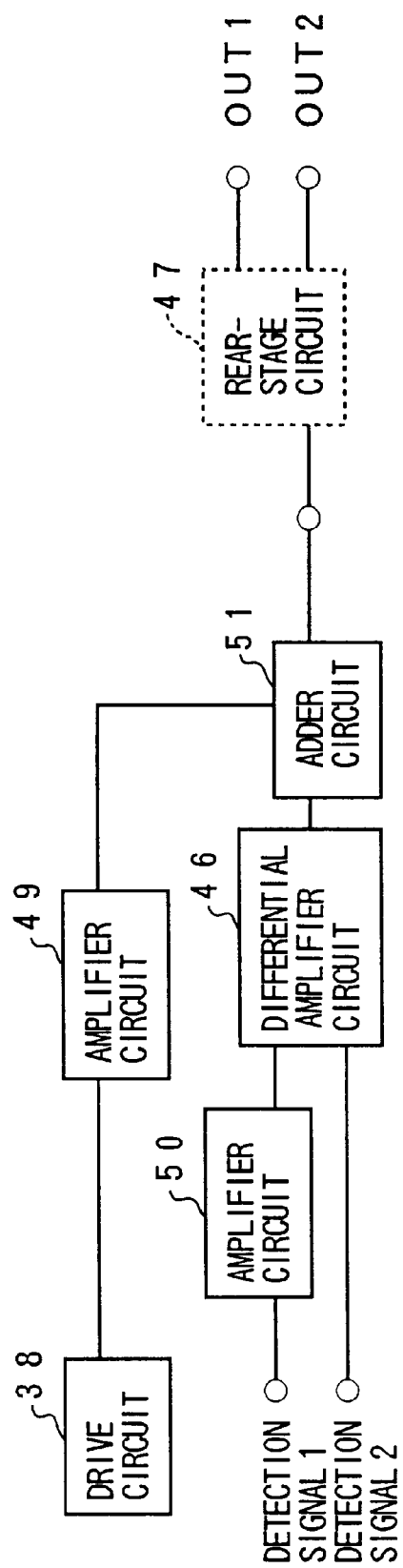
FIG. 21 is a block diagram of an eighth embodiment of the present invention.
Figure 25:
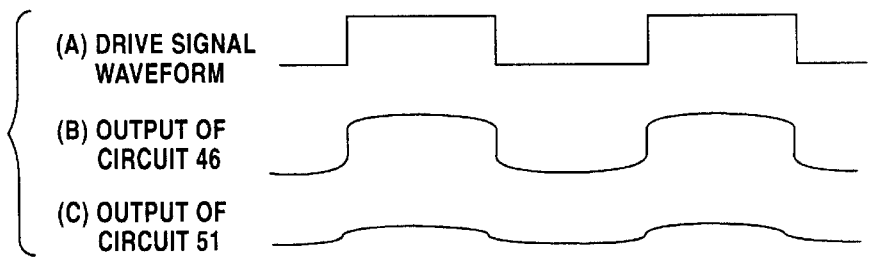
FIG. 25 is a waveform diagram of an operation of the eighth embodiment of the present invention.

FIG. 21 shows a vibratory gyro device according to an eight embodiment of the present invention, in which parts that are the same as those shown in the previously described figures are given the same reference numbers. FIG. 25 is a waveform diagram of the operation of the vibratory gyro device shown in FIG. 21. The structure shown in FIG. 21 corresponds to another combination of the structures shown in FIGS. 18 and 19. As shown in (B) of FIG. 25, the output signal of the differential amplifier circuit 46 is a rectangular wave signal as has been described with reference to FIGS. 18 and 22. The drive signal output by the drive circuit 38 is also a rectangular wave signal as shown in (A) of FIG. 25. Hence, by adding the above two rectangular wave signals after phase adjustment, it is possible to reduce, in the output signal of the adder circuit 51, the electrostatic coupling leakage and the drive-side electro-mechanical coupling leakage, as shown in (C) of FIG. 25. A sin-wave component remaining in the output signal of the adder circuit 51 is based on the mechanical coupling leakage, and can be canceled by the way shown in FIGS. 7A and 7B.

Various variations of the structures shown in FIGS. 18 through 21 can be made. For example, an amplifier circuit which amplifies the second detection signal DET2 can be provided in any of the structures shown in FIGS. 18 through 21.

Figure 26:
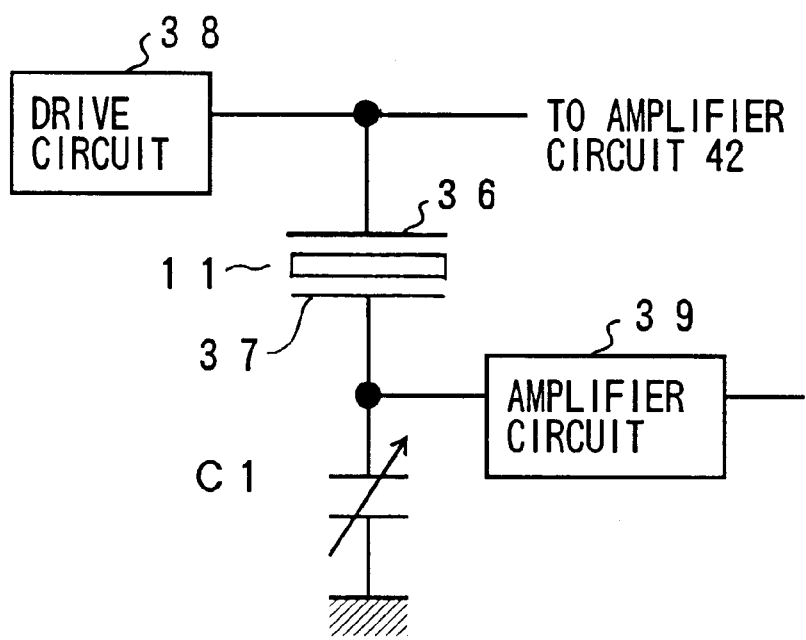
FIG. 26 is a block diagram of a phase adjustment circuit which can be used in the embodiments of the present invention.

FIG. 26 shows an example of the phase adjustment circuit which has been described previously. A variable capacitor C1, which functions as the phase adjustment circuit, is provided between the ground-side electrodes attached to the drive-side arm 11 and the ground. By varying the capacitance of the variable capacitor C1, it is possible to adjust the phase relationship between the detection signal and the signal obtained at the electrode 37.

Figure 4:
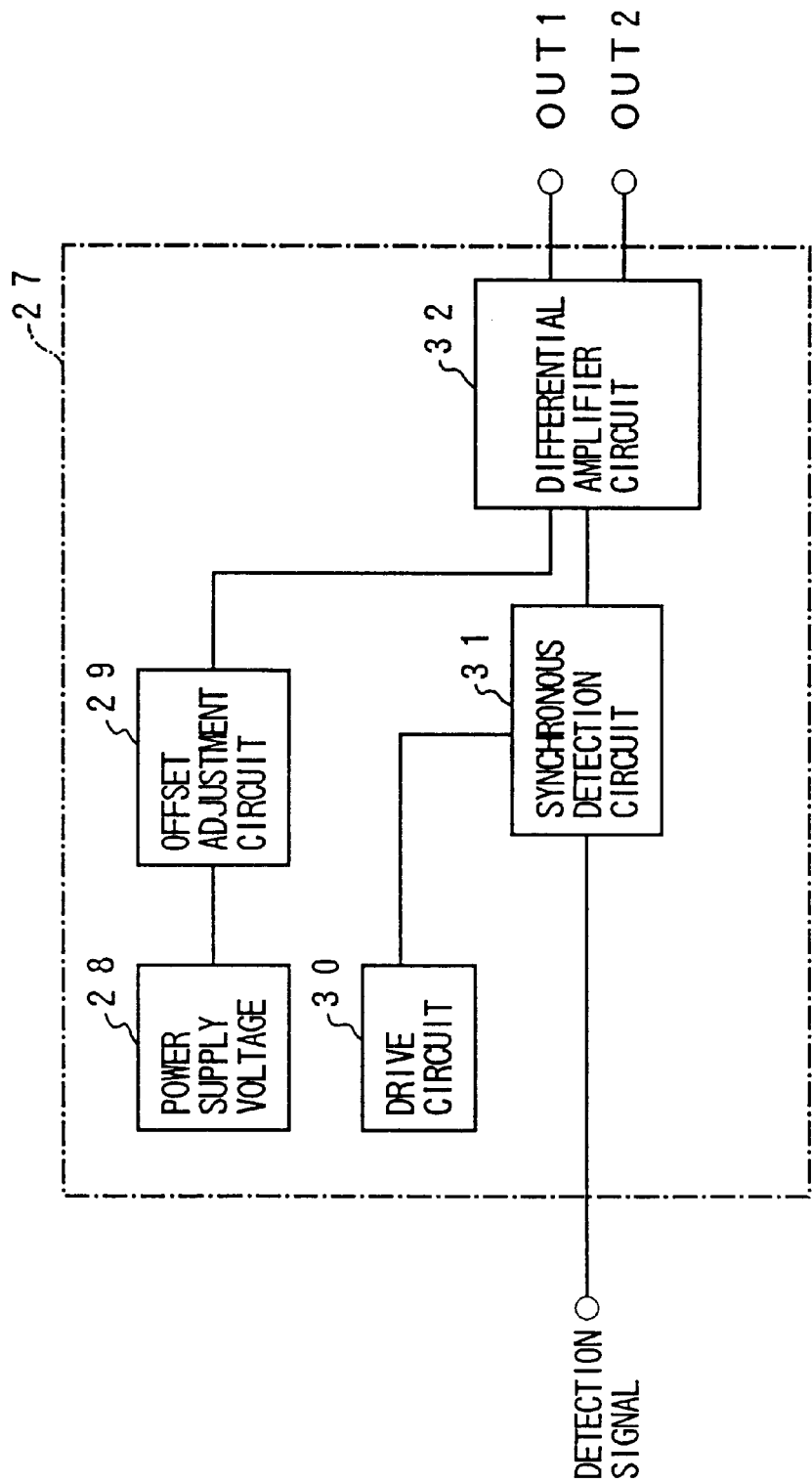
FIG. 4 is a block diagram of a detection circuit for use in the vibratory gyro shown in FIGS. 1A and 1B.
Figure 5:
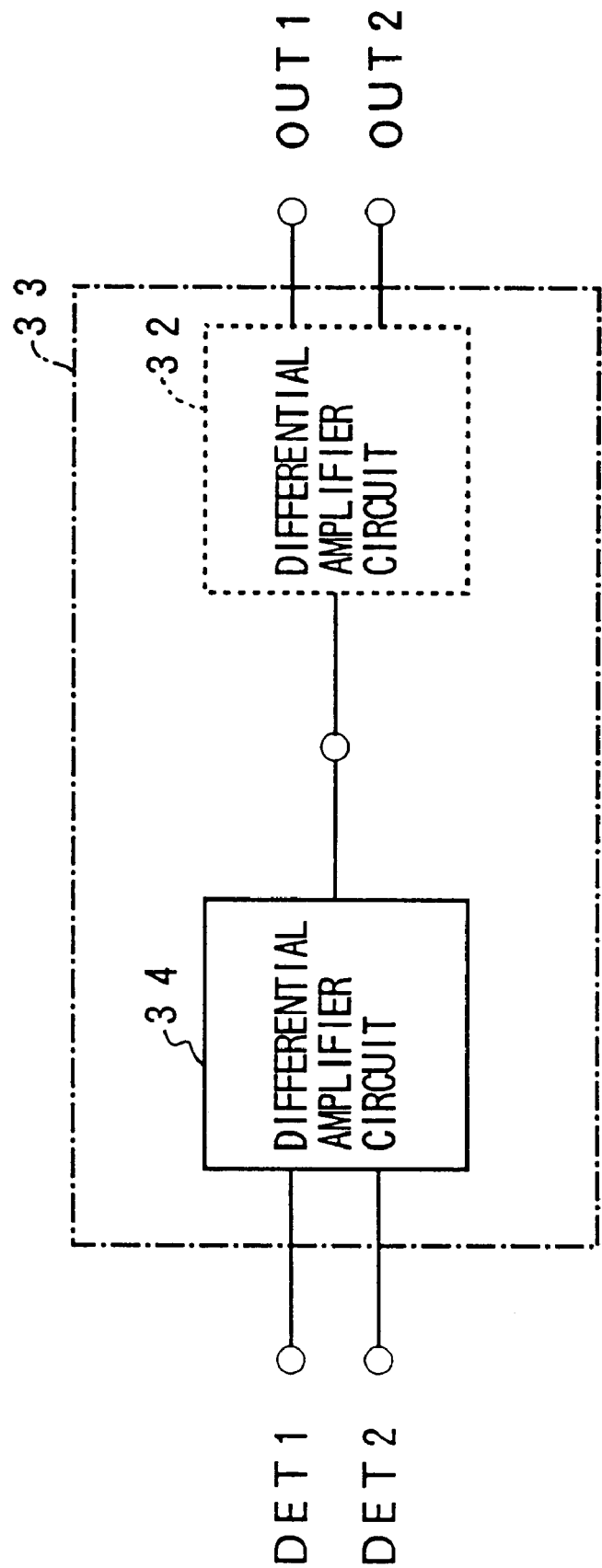
FIG. 5 is a block diagram of a detection circuit for use in the vibratory gyro shown in FIGS. 2A and 2B.
Figure 6:
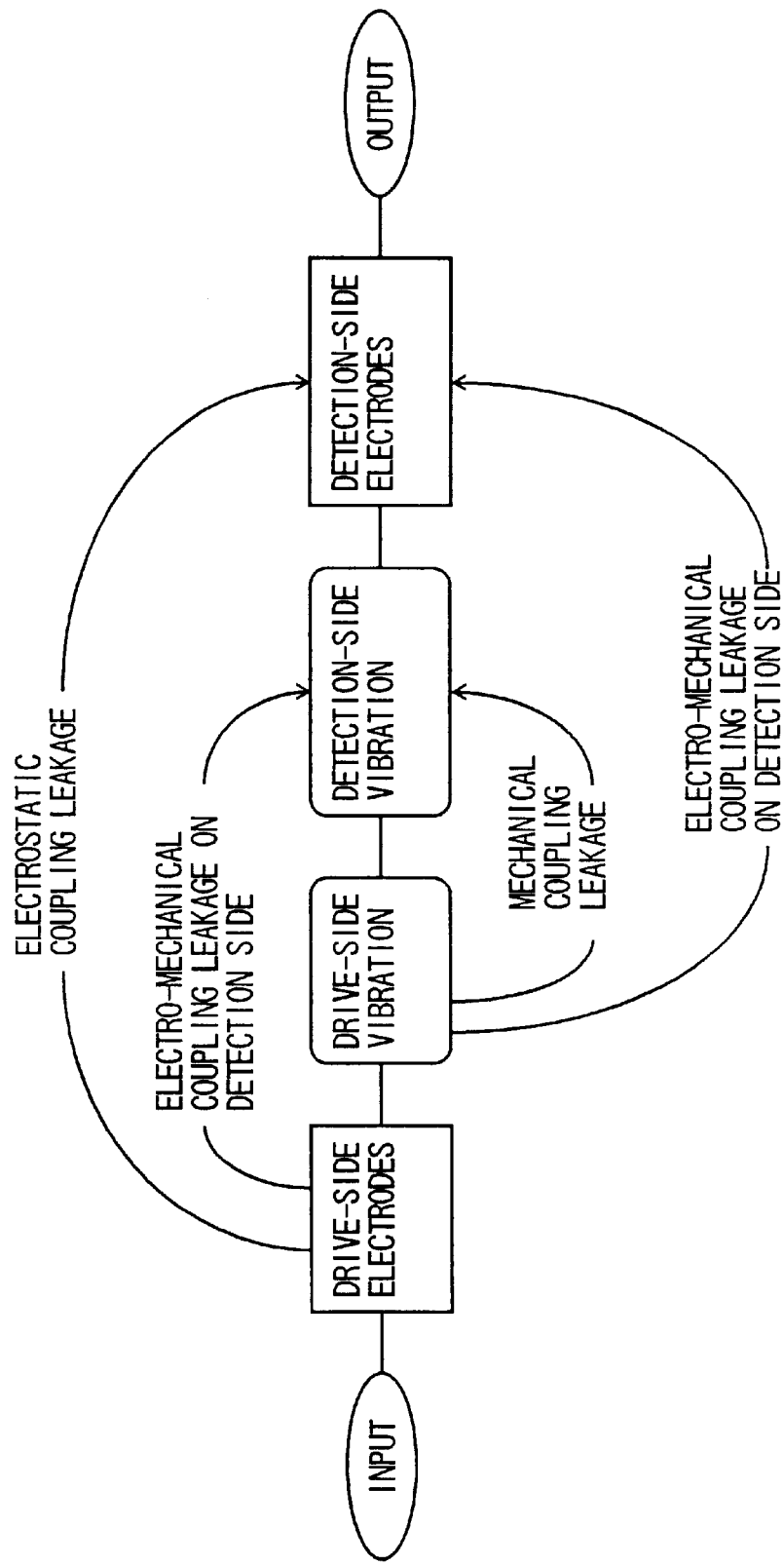
FIG. 6 is a diagram which illustrates factors which cause leakage voltages.
Figure 27:
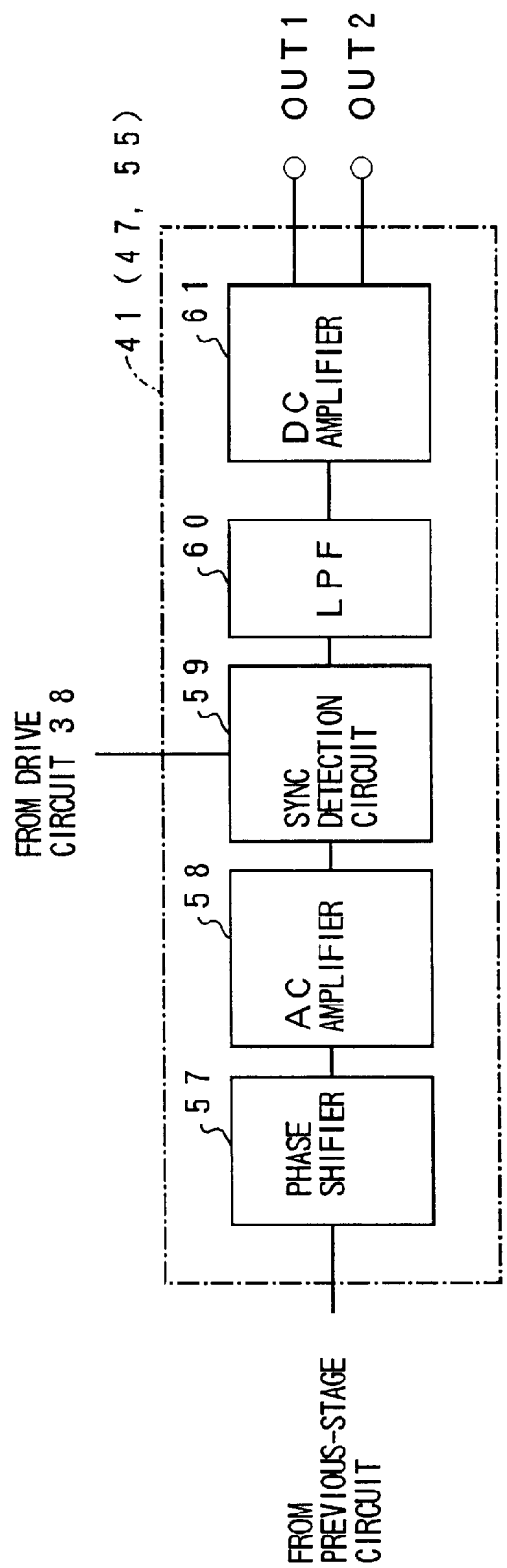
FIG. 27 is a block diagram of a rear-stage circuit shown in FIGS. 10 through 13 and FIGS. 18 through 21.

FIG. 27 is a block diagram of an example of the rear-stage circuits 41, 47 and 55. Each of the rear-stage circuits 41, 47 and 55 is made up of a phase shifter 57, an AC amplifier 58, a phase detection circuit 59, a low-pass filter (LPF) 60, and a DC amplifier 61. The phase shifter 57 shifts the phase of the output signal from the previous-stage circuit (which is, for example, the output signal of the differential amplifier 40 shown in FIG. 10). The AC amplifier 58 AC-amplifies the output signal of the phase shifter 57. The synchronous detection circuit 59 performs the synchronous detection operation on the output signal of the AC amplifier 58 by using the drive signal from the drive circuit 38. The synchronous detection circuit 59 can be formed of a conventional IC for use in synchronous detection. The low-pass filter 60 eliminates unnecessary high-frequency components, such as, overshoot components, contained in the synchronous detection output. The DC amplifier 61 DC-amplifies the signal from the low-pass filter 60. The DC amplifier 61 corresponds to the offset adjustment circuit 29 and the differential amplifier circuit 32 shown in FIG. 4, and produces the output signals OUT1 and OUT2 dependent on the level of the signal from the low-pass filter 60. As has been described previously, the potential difference between the output signals OUT1 and OUT2 indicates the angular velocity applied to the gyro, and the sign thereof indicates the direction of the rotation.

In the rear-stage circuit 55 shown in FIGS. 19 and 20, one of the two signals from the previous-stage circuit is applied to the phase shifter 57.

Figure 28:
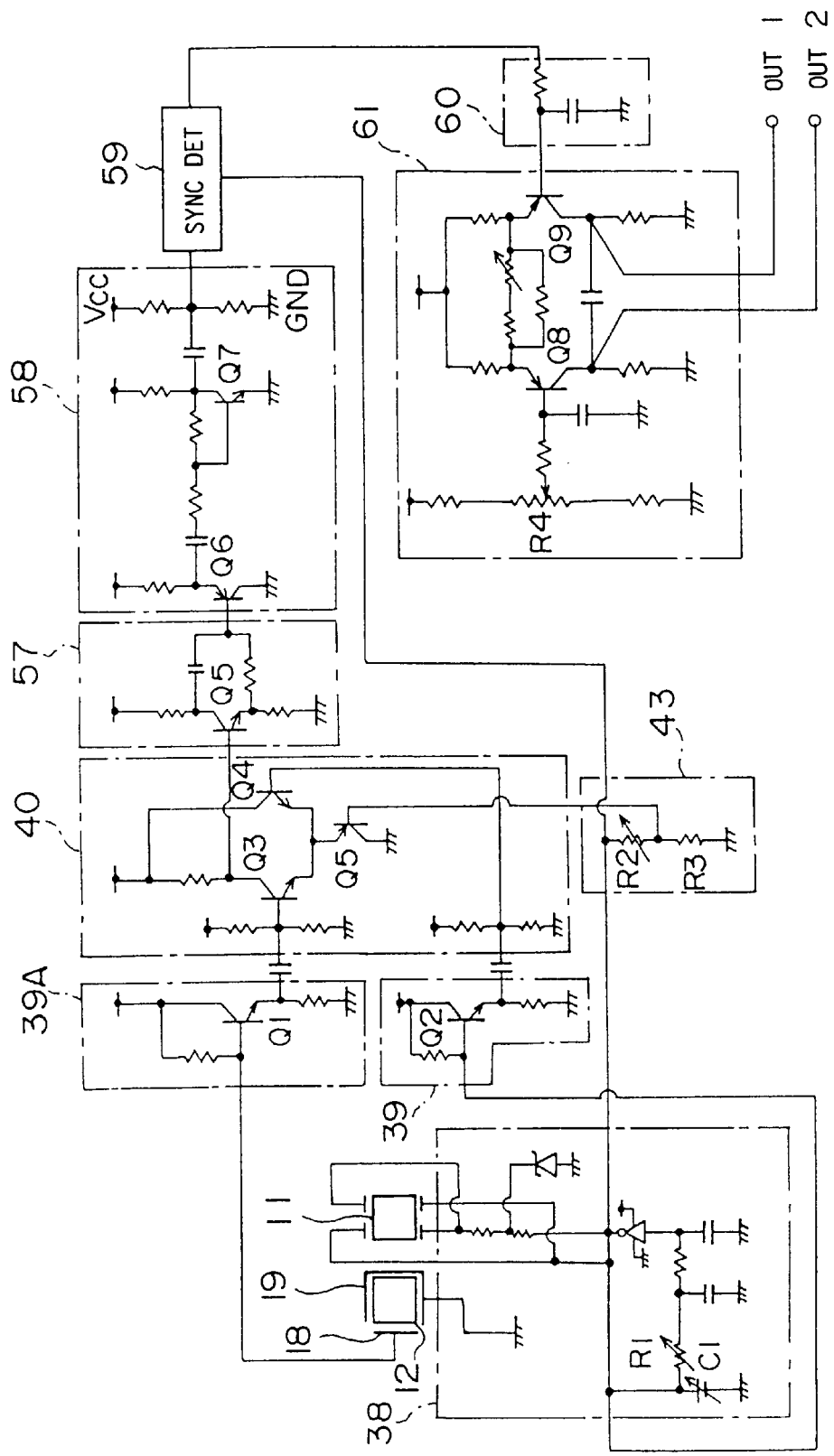
FIG. 28 is a circuit diagram of a detailed circuit configuration of the structure of the fourth embodiment of the present invention.

FIG. 28 is a circuit diagram of a circuit which corresponds to the structure shown in FIG. 13. The drive circuit 38 includes resistors including a variable resistor R1, capacitors including the variable capacitor C1, tri-stage buffers and Zener diodes. These components form an oscillation circuit together with the drive-side arm 11. The oscillation frequency and the phase can be adjusted by the variable resistor R1 and the variable capacitor C1. It should be noted that the variable capacitor C1 shown in FIG. 26 is explained as the phase adjustment circuit, while the variable capacitor C1 shown in FIG. 28 is illustrated as a part of the drive circuit 38.

The amplifier circuit 39 connected to the variable capacitor C1 is an emitter-follower circuit having a transistor Q2. Although not used in FIG. 13, an amplifier circuit 39A is used to amplify the detection signal. The amplifier circuit 39A is an emitter-follower circuit having a transistor Q1.

The output signals of the amplifier circuits 39 and 39A are applied to a differential amplifier circuit 40. The drive signal from the drive circuit 38 is applied to the adder circuit 43. The amplifier circuit 42 shown in FIG. 13 is not used in the structure shown in FIG. 28. The differential amplifier circuit 40 includes transistors Q3, Q4 and Q5. The output signal of the amplifier circuit 39A is applied to the base of the transistor Q4 via a coupling capacitor. The output signal of the amplifier 39 is applied to the base of the transistor Q4 via a coupling capacitor. The transistor Q5 functions as a constant-current source, and the amount of current thereof is controlled by the output signal of the adder circuit 43. The adder circuit 43 includes a variable resistor R2 and a stationary resistor R3. The drive voltage is divided by the resistors R2 and R3, and a divided voltage is applied to the base of the transistor Q5. The base voltage thus defined functions to change the amplifying factor of the differential amplifier circuit 40.

It should be noted that FIG. 13 is illustrated so that the adder circuit 43 adds the output signal of the differential amplifier circuit 40 and the drive signal, while the circuit configuration shown in FIG. 28 substantially realizes the function shown in FIG. 13 by changing the amplifying factor of the differential amplifier circuit 40 according to the drive voltage.

One of the two output signals of the differential amplifier circuit 40 (the collector voltage of the transistor Q3) is applied to the phase shifter 57 of the rear-stage circuit 41. The phase shifter 57 includes a transistor Q5, resistors and a capacitor 57, and determines the phase of the signal applied to the base of the transistor Q5. The AC amplifier 58 includes transistors Q6 and Q7, resistors and capacitors, and AC-amplifies the output signal of the phase shifter 57. The output signal of the AC amplifier 58 is applied to the synchronous detection circuit 59, and is subjected to the synchronous detection process using the drive signal from the drive circuit 38.

The signal from the synchronous detection circuit 59 passes through the low-pass filter 60, which includes a resistor and a capacitor, and is applied to the DC amplifier 61. As shown in FIG. 28, the DC amplifier 61 includes transistors Q8, Q9, resistors including a variable resistor R4, and a capacitor. The signal from the low-pass filter 60 is applied to the base of the transistor Q9. A reference voltage defined by the resistor R4 is applied to the base of the transistor Q8 via the resistor. The reference voltage thus produced functions as an offset voltage adjustment voltage, which adjusts the offset of a differential amplifier composed of the transistors Q8 and Q9. The output signals OUT1 and OUT2 are obtained at the collectors of the transistors Q9 and Q8.

The circuit shown in FIG. 28 operates with a power supply voltage Vcc.

The detailed circuit configurations which realize the structures shown in FIGS. 10 through 12 will be apparent from the circuit configuration shown in FIG. 28 corresponding to the structure shown in FIG. 13.

Figure 29:
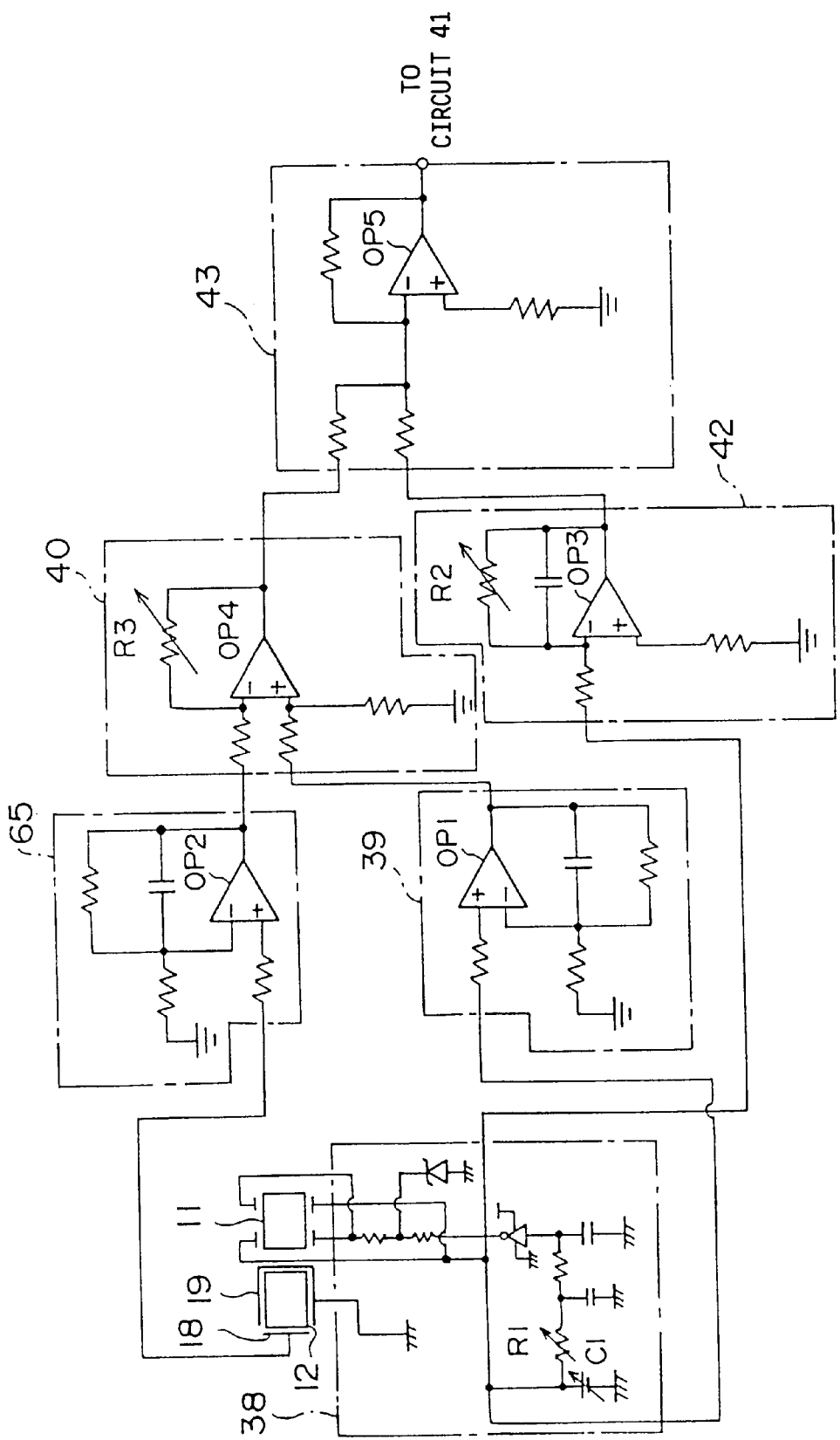
FIG. 29 is a circuit diagram of another detailed circuit configuration of the structure of the fourth embodiment of the present invention.

FIG. 29 is a circuit diagram of a circuit configuration designed so that the configuration shown in FIG. 13 is realized by operational amplifiers. The amplifier circuit 39 connected to the ground-side electrode 37 attached to the drive-side arm 11 includes an operational amplifier OP1, resistors and a capacitor. The capacitor connected between the inverting-input terminal of the operational amplifier OP2 and the output terminal thereof functions to smooth the unnecessary high-frequency components such as overshoot components. The amplifier circuit 42 connected to the drive circuit 38 includes an operational amplifier OP3, resistors including the variable resistor R2 and a capacitor. The signal obtained at the electrode 37 is inverted here, and is applied to the adder circuit 43. By varying the resistance of the variable resistor R2, the amplifying factor of the amplifier circuit 42 can be adjusted. The capacitor connected between the inverting input terminal of the operational amplifier OP3 and the output terminal thereof functions to smooth unnecessary components, such as overshoot components.

The detection signal is amplified by an amplifier circuit 65 (which is not used in the configuration shown in FIG. 13), and is applied to the differential amplifier circuit 40. The amplifier circuit 65 includes an operational amplifier OP2, resistors and a capacitor. The capacitor connected between the inverting input terminal of the operational amplifier OP2 and the output terminal thereof functions to smooth unnecessary components, such as overshoot components.

The differential amplifier circuit 40 includes an operational amplifier OP4, and resistors including a variable resistor R3. The variable resistor R3 functions to adjust the amplifying factor of the differential amplifier circuit 40. The output signal of the amplifier circuit 65 is applied to the non-inverting input terminal of the operational amplifier OP4 via the resistor. The output signal of the operational amplifier 40 is fed back to the inverting input terminal of the operational amplifier OP4.

The adder circuit 43 is made up of an operational amplifier OP5, and resistors. The output signals of the differential amplifier circuit 40 and the amplifier circuit 42 are added via the respective resistors, and is applied to the inverting input terminal of the operational amplifier OP5. The output signal of the operational amplifier OP5 is output to the rear-stage circuit 41 (FIG. 13).

The detailed circuit configurations of the structures shown in FIGS. 10 through 12 using operational amplifiers will be apparent from the configuration shown in FIG. 29 which realizes the structure shown in FIG. 13.

Figure 30:
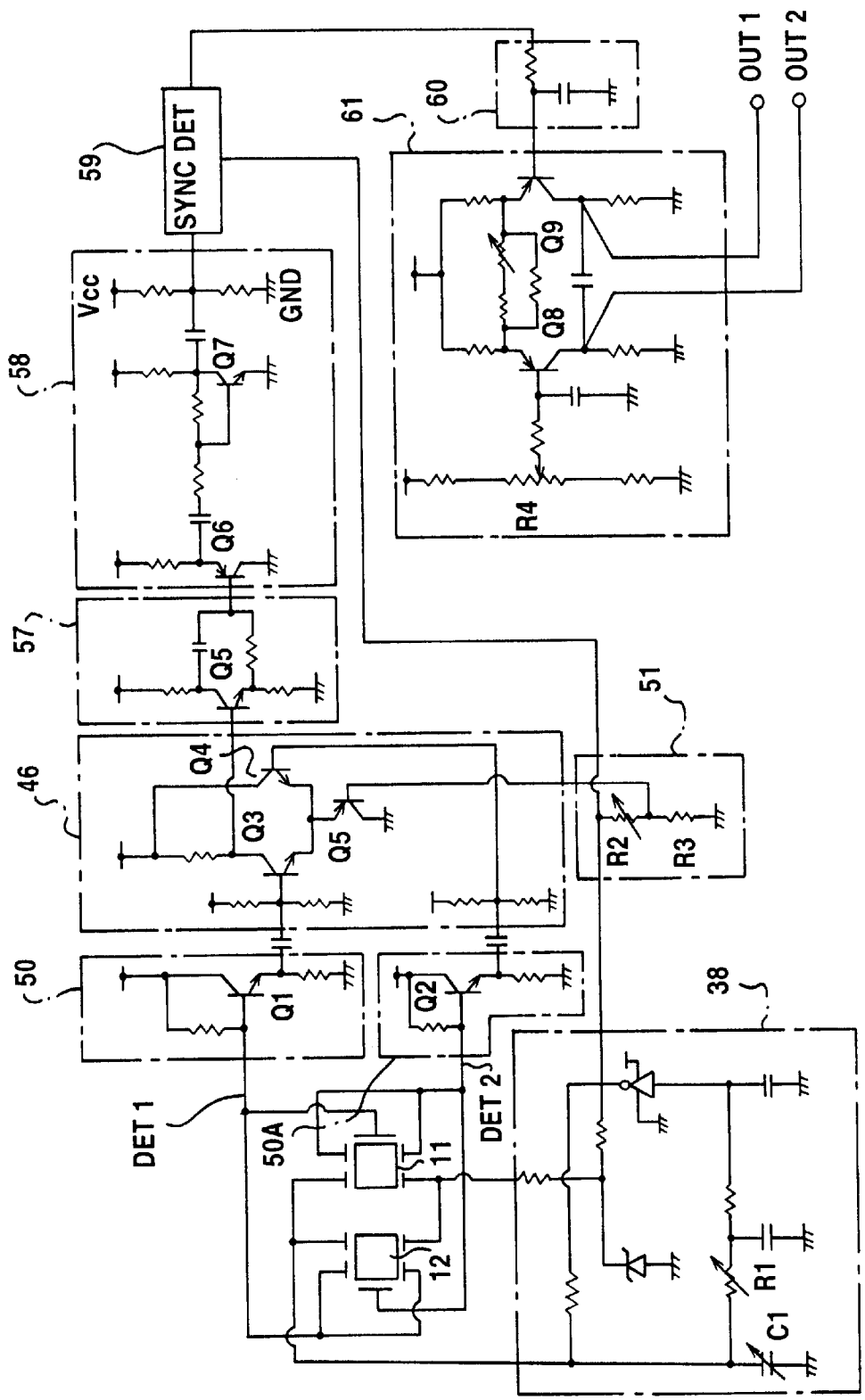
FIG. 30 is a circuit diagram of a detailed circuit configuration of the structure of the eighth embodiment of the present invention.

FIG. 30 is a circuit diagram of a configuration which corresponds to the structure shown in FIG. 21. In FIG. 30, parts that are the same as those shown in FIG. 28 are given the same reference numbers. The amplifier circuit 50 which amplifies the detection signal DET1 has the same configuration as the amplifier circuit 39A shown in FIG. 28. An amplifier circuit 50A which amplifies the detection signal DET2 has the same configuration as the amplifier 39 shown in FIG. 28. The differential amplifier circuit 46 shown in FIG. 30 is configured in the same manner as the differential amplifier circuit 40 shown in FIG. 28. The adder circuit 51 shown in FIG. 28 is configured in the same manner as the adder circuit 43 shown in FIG. 28.

Figure 31:
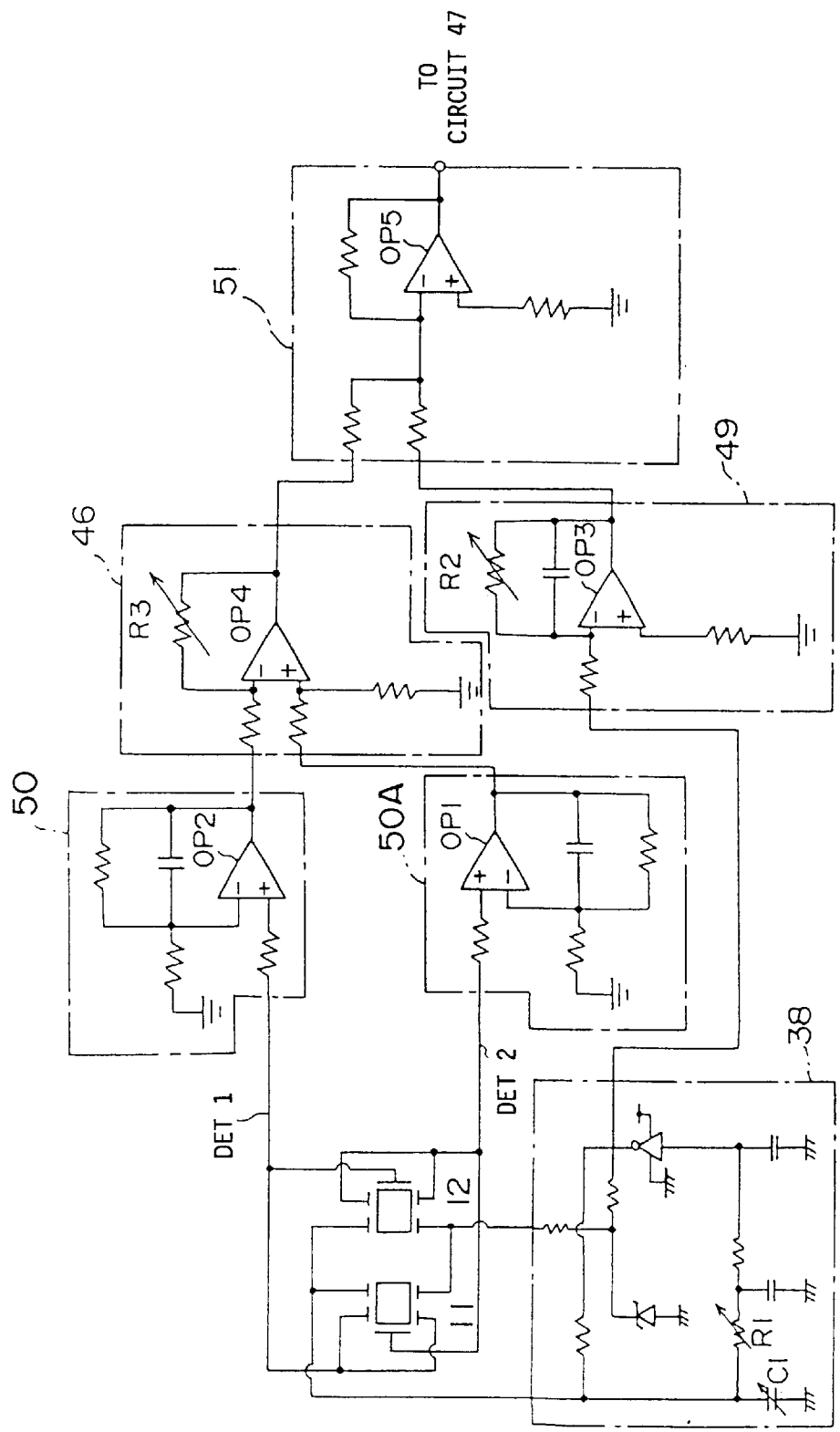
FIG. 31 is a circuit diagram of another detailed circuit configuration of the structure of the eighth embodiment of the present invention.

FIG. 31 is a circuit diagram of a configuration which realizes the structure shown in FIG. 21 by using operational amplifiers. In FIG. 31, parts that are the same as those shown in FIG. 29 are given the same reference numbers. The amplifier circuit 50 which amplifies the detection signal DET1 is configured in the same manner as the amplifier circuit 65 shown in FIG. 29. The amplifier circuit 50A shown in FIG. 31 is configured in the same manner as the amplifier circuit 39 shown in FIG. 29. The differential amplifier circuit 46 shown in FIG. 31 is configured in the same manner as the differential amplifier circuit 40 shown in FIG. 29. The amplifier circuit 49 shown in FIG. 31 is configured in the same manner as the amplifier circuit 42 shown in FIG. 29. The adder circuit 51 shown in FIG. 31 is configured in the same manner as the adder circuit 43 shown in FIG. 29.

The present invention is not limited to the specifically disclosed embodiments, and variations and modifications may be made without departing from the scope of the present invention.

What is claimed is:

1. A detection circuit for a vibratory gyro comprising:

a first circuit which detects a detection signal output from the vibratory gyro and produces an output signal indicative of an angular velocity applied to the vibratory gyro; and a second circuit which is operatively coupled to said first circuit and reduces a leakage component included in the detection signal based upon a signal related to driving the vibratory gyro and the detection signal.

2. The detection circuit as claimed in claim 1, wherein said second circuit includes a circuit part which reduces at least one of an electro-mechanical coupling leakage directed from a drive side of the vibratory gyro to a detection side thereof and an electrostatic coupling leakage directed from the drive side of the vibratory gyro to the detection side thereof.

3. The detection circuit as claimed in claim 1, wherein said second circuit includes a differential amplifier circuit which performs a differential amplifying operation on the detection signal and a signal obtained at a first drive electrode which is paired with a second drive electrode to which a drive signal is applied, so that an electro-mechanical coupling leakage included in the detection signal can be reduced.

4. The detection circuit as claimed in claim 1, wherein said second circuit includes an adder circuit which adds a drive signal applied to the vibratory gyro and the detection signal, so that an electrostatic coupling leakage included in the detection signal can be reduced.

5. The detection circuit as claimed in claim 1, wherein:

the detection signal includes a first detection signal and a second detection signal; and said second circuit includes a differential amplifier circuit which performs a differential amplifying operation on the first and second detection signals, so that electro-mechanical coupling leakages included in the first and second detection signals can be reduced.

6. The detection circuit as claimed in claim 1, wherein:

the detection signal includes a first detection signal and a second detection signal; and said second circuit includes an adder circuit which adds the first and second detection signals, so that electro-mechanical coupling leakages included in the first and second detection signals can be reduced.

7. The detection circuit as claimed in claim 1, wherein said second circuit includes:

an adder circuit which adds a drive signal applied to the vibratory gyro and the detection signal; and a differential amplifier circuit which performs a differential amplifying operation on an output signal of the adder circuit and a signal obtained at a first electrode which is paired with a second electrode to which the drive signal is applied.

8. The detection circuit as claimed in claim 1, wherein said second circuit includes:

a differential amplifier circuit which performs a differential amplifying operation on the detection signal and a signal obtained at a first electrode which is paired with a second electrode to which a drive signal is applied; and an adder circuit which adds an output signal of the differential amplifier circuit and the drive signal applied to the second electrode of the vibratory gyro.

9. The detection circuit as claimed in claim 1, wherein:

the detection signal includes a first detection signal and a second detection signal; and said second circuit includes an adder circuit which adds a drive signal applied to the vibratory gyro and the first and second detection signals, and a differential amplifier circuit which performs a differential amplifying operation on two output signals of the adder circuit.

10. The detection circuit as claimed in claim 1, wherein:

the detection signal includes a first detection signal and a second detection signal; and said second circuit includes a differential amplifier circuit which performs a differential amplifying operation on the first and second detection signals, and an adder circuit which adds a drive signal applied to the vibratory gyro and an output signal of the differential amplifying circuit.

11. A vibratory gyro device comprising:

a vibratory gyro; and a detection circuit including a first circuit which detects a detection signal output from the vibratory gyro and produces an output signal indicative of an angular velocity applied to the vibratory gyro, and a second circuit which is operatively coupled to said first circuit and reduces a leakage component included in the detection signal based upon a signal related to driving the vibratory gyro and the detection signal.

* * * * *